United States Patent
Ishizaki et al.

(10) Patent No.: US 7,473,470 B2
(45) Date of Patent: Jan. 6, 2009

(54) PARTICULATE WATER ABSORBING AGENT WITH IRREGULARLY PULVERIZED SHAPE

(75) Inventors: Kunihiko Ishizaki, Suita (JP); Takahiro Kitano, Himeji (JP); Yoshifumi Adachi, Himeji (JP); Hiroko Ueda, Himeji (JP); Katsuyuki Wada, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 185 days.

(21) Appl. No.: 10/588,530

(22) PCT Filed: Mar. 29, 2005

(86) PCT No.: PCT/JP2005/006551
§ 371 (c)(1),
(2), (4) Date: Aug. 7, 2006

(87) PCT Pub. No.: WO2005/092955
PCT Pub. Date: Oct. 6, 2005

(65) Prior Publication Data
US 2007/0141338 A1    Jun. 21, 2007

(30) Foreign Application Priority Data
Mar. 29, 2004 (JP) .............................. 2004-096083
Jul. 20, 2004 (JP) .............................. 2004-211856

(51) Int. Cl.
*B32B 5/16* (2006.01)
(52) U.S. Cl. ..................... 428/407; 428/292.1; 428/327
(58) Field of Classification Search ................. 428/403, 428/407, 327, 292.1
See application file for complete search history.

(56) References Cited

U.S. PATENT DOCUMENTS

| | | | |
|---|---|---|---|
| 4,093,776 A | 6/1978 | Aoki et al. | |
| 4,286,082 A | 8/1981 | Tsubakimoto et al. | |
| 4,367,323 A | 1/1983 | Kitamura et al. | |
| 4,446,261 A | 5/1984 | Yamasaki et al. | |

(Continued)

FOREIGN PATENT DOCUMENTS

DE    4020780    10/1991

(Continued)

OTHER PUBLICATIONS

Gourmand et al., "Superabsorbent Polymers for Cable Application," *Nonwovens World*, Oct.-Nov. 2000, pp. 73-83.

*Primary Examiner*—H. T Le
(74) *Attorney, Agent, or Firm*—Occhiuti Rohlicek & Tsao LLP

(57) ABSTRACT

The present invention provides a particulate water absorbing agent for a thin type absorbing substrate suitable for actual use. A particulate water absorbing agent having irregularly pulverized shape, characterized by comprising, a surface crosslinked water-absorbing resin obtained by crosslinking polymerization of an unsaturated monomer with an acid group and/or salts thereof, which absorbing agent contains agglomerated particles therein and further satisfies (i) centrifuge retention capacity (CRC) in a physiological saline solution of not lower than 32 g/g, (ii) mass median particle size (D50) of 200 to 400 µm, and (iii) particles smaller than 600 µm and not smaller than 150 µm of 95 to 100% by weight. By using the particulate water absorbing agent, such absorbing articles can be obtained as have few rugged surface after water absorption, excellent liquid permeation property.

20 Claims, 1 Drawing Sheet

U.S. PATENT DOCUMENTS

| | | | |
|---|---|---|---|
| 4,625,001 A | 11/1986 | Tsubakimoto et al. |
| 4,683,274 A | 7/1987 | Nakamura et al. |
| RE32,649 E | 4/1988 | Brandt et al. |
| 4,873,299 A | 10/1989 | Nowakowsky et al. |
| 4,950,692 A | 8/1990 | Lewis et al. |
| 4,973,632 A | 11/1990 | Nagasuna et al. |
| 4,985,518 A | 1/1991 | Alexander et al. |
| 5,061,259 A | 10/1991 | Goldman et al. |
| 5,124,416 A | 6/1992 | Haruna et al. |
| 5,140,076 A | 8/1992 | Hatsuda et al. |
| 5,145,906 A | 9/1992 | Chambers et al. |
| 5,147,343 A | 9/1992 | Kellenberger |
| 5,149,335 A | 9/1992 | Kellenberger et al. |
| 5,244,735 A | 9/1993 | Kimura et al. |
| 5,250,640 A | 10/1993 | Irie et al. |
| 5,264,495 A | 11/1993 | Irie et al. |
| 5,380,808 A | 1/1995 | Sumiya et al. |
| 5,409,771 A | 4/1995 | Dahmen et al. |
| 5,419,956 A | 5/1995 | Roe |
| 5,453,323 A | 9/1995 | Chambers et al. |
| 5,462,972 A | 10/1995 | Smith et al. |
| 5,478,879 A | 12/1995 | Kajikawa et al. |
| 5,562,646 A | 10/1996 | Goldman et al. |
| 5,601,542 A | 2/1997 | Melius et al. |
| 5,610,220 A | 3/1997 | Klimmek et al. |
| 5,669,894 A | 9/1997 | Goldman et al. |
| 5,684,106 A | 11/1997 | Johnson et al. |
| 5,797,893 A | 8/1998 | Wada et al. |
| 5,994,440 A | 11/1999 | Staples et al. |
| 6,071,976 A | 6/2000 | Dairoku et al. |
| 6,087,002 A | 7/2000 | Kimura et al. |
| 6,127,454 A | 10/2000 | Wada et al. |
| 6,150,582 A | 11/2000 | Wada et al. |
| RE37,021 E | 1/2001 | Aida |
| 6,184,433 B1 | 2/2001 | Harada et al. |
| 6,187,872 B1 | 2/2001 | Yanase et al. |
| 6,194,531 B1 | 2/2001 | Hatsuda et al. |
| 6,228,930 B1 | 5/2001 | Dairoku et al. |
| 6,254,990 B1 | 7/2001 | Ishizaki et al. |
| 6,297,335 B1 | 10/2001 | Funk et al. |
| 6,414,214 B1 | 7/2002 | Engelhardt et al. |
| 6,444,744 B1 | 9/2002 | Fujimaru et al. |
| 6,562,879 B1 * | 5/2003 | Hatsuda et al. ............... 521/56 |
| 7,169,843 B2 * | 1/2007 | Smith et al. ................. 524/556 |
| 2002/0120074 A1 | 8/2002 | Wada et al. |
| 2002/0128618 A1 | 9/2002 | Frenz et al. |

FOREIGN PATENT DOCUMENTS

| | | |
|---|---|---|
| EP | 0 532 002 B1 | 3/1993 |
| EP | 0 605 215 B1 | 7/1994 |
| EP | 0 629 411 B1 | 12/1994 |
| EP | 0 707 603 B1 | 4/1996 |
| EP | 0 712 659 B1 | 5/1996 |
| EP | 0 811 636 B1 | 12/1997 |
| EP | 0 844 270 A1 | 5/1998 |
| EP | 0 922 717 B1 | 6/1999 |
| EP | 0 937 739 B1 | 8/1999 |
| EP | 0 940 148 A1 | 9/1999 |
| EP | 0 955 086 B1 | 11/1999 |
| EP | 1 029 886 A2 | 8/2000 |
| EP | 1 153 656 A2 | 11/2001 |
| EP | 1 352 927 A1 | 10/2003 |
| GB | 2 267 094 A | 11/1993 |
| JP | 61-97333 | 5/1986 |
| JP | 6-57010 | 3/1994 |
| JP | 8-337726 | 12/1996 |
| JP | 2005-60677 | 3/2005 |
| RU | 2139096 | 10/1999 |
| WO | WO 91/17200 | 11/1991 |
| WO | WO 95/22356 | 8/1995 |
| WO | WO 96/17884 | 6/1996 |
| WO | WO02/053198 A1 | 7/2002 |
| WO | WO03/104349 A1 | 12/2003 |
| WO | WO 2004/069936 A1 | 8/2004 |
| WO | WO 2005/010102 A1 | 2/2005 |

* cited by examiner

PARTICULATE WATER ABSORBING AGENT WITH IRREGULARLY PULVERIZED SHAPE

CROSS-REFERENCE TO RELATED APPLICATIONS

This application is the National Stage of International Application No. PCT/JP2005/006551, filed on Mar. 29, 2005, which claims the benefit of Japanese Patent Applications Serial No. 2004-096083, filed on Mar. 29, 2003, and Serial No. 2004-211856, filed on Jul. 20, 2004. The contents of all of the foregoing applications are hereby incorporated by reference in their entirety.

BACKGROUND OF THE INVENTION

1. Field of the Invention

The present invention relates to a particulate water absorbing agent having a water-absorbing resin as a main component. In particular, it relates to a particulate water absorbing agent having irregularly pulverized shape used for an absorbing substrate in a thin type diaper or a thin type sanitary napkin, which maintains conventionally not obtained thin state even after use and exerts superior absorbing ability.

2. Description of Related Art

At present, as component materials in sanitary articles such as a paper diaper, a sanitary napkin, so to speak an incontinence pad, and the like, a water-absorbing resin to absorb body fluid and hydrophilic fibers such as pulp are widely used. As the water-absorbing resin, for example, partially neutralized crosslinked polyacrylic acid, hydrolysates of starch-acrylic acid graft polymer, saponified vinyl acetate-acrylate copolymers, hydrolysates of acrylonitrile copolymer or acrylamide copolymers or crosslinked polymers thereof, crosslinked polymers of cationic monomers, and the like are used as main raw materials.

Water absorption characteristics conventionally required to the water-absorbing resin include superior liquid absorption capacity or water absorption speed, gel strength and gel permeability in contact with aqueous liquid such as body fluid, along with water suction force to suck water from a substrate containing aqueous liquid. Further, as recent trends, a water-absorbing resin powder with very narrow particle size distribution or a water-absorbing resin with high absorbency and low soluble content has been required and high absorbency against pressure or liquid permeability under pressure has essentially been required. Further, a water-absorbing resin superior also in handling, in addition to these improved performances has been required.

For example, there are many patent applications on many parameters specifying various properties of these water-absorbing resins or water absorbing agents with a water-absorbing resin as a main component, or on measurement methods thereof (US Reissued 32649, UK2267094B, U.S. Pat. Nos. 5,051,259, 5,419,956, 6,087,002, EP0629441, EP0707603, EP0712659, EP1029886, U.S. Pat. Nos. 5,462,972, 5,453,323, 5,797,893, 6,127,454, 6,184,433, 6,297,335, US Reissued 37021, U.S. Pat. Nos. 5,140,076, 6,414,214B1, 5,994,440, 6,444,744, 6,194,531, EP0940148, EP1153656, EP0605215, U.S. Pat. Nos. 5,147,343, 5,149,335, EP0532002, U.S. Pat. Nos. 5,601,452, 5,562,646, 5,669,894, 6,150,582, WO02/053198, EP0937739).

Water-absorbing resins superior in gel strength, soluble content and absorption capacity are proposed in US Reissued 32649. A water-absorbing resin superior in liquid permeability under no pressure, absorption speed and absorption capacity is proposed in UK2267094B. Technology specifying specific particle size distribution is also proposed in U.S. Pat. Nos. 5,051,259, 5,419,956, 6,087,002 and EP0629441. Further, a water-absorbing resin superior in absorbency against pressure under various loads or many measurement methods therefore are also proposed and water-absorbing resins with superior absorbency against pressure alone or in combination with other property are proposed in EP0707603, EP0712659, EP1029886, U.S. Pat. Nos. 5,462,972, 5,453,323, 5,797,893, 6,127,454, 6,184,433, 6,297,335 and US Reissued 37021.

Water-absorbing resins with little property decrease by impact are proposed in U.S. Pat. Nos. 5,140,076 and 6,414,214B1. A water-absorbing resin with specific powdery dust amount is proposed in U.S. Pat. No. 5,994,440, and a water-absorbing resin with less coloring is proposed in U.S. Pat. No. 6,444,744. Water-absorbing resins superior in gel durability in an aqueous L-ascorbic acid solution as index of urine resistance or superior in water absorption ability are proposed in U.S. Pat. No. 6,194,531 and EP0940148. A water-absorbing resin with superior air permeability is proposed in EP1153656. A water-absorbing resin with less residual monomers is proposed in EP0605215.

Further, in U.S. Pat. Nos. 5,147,343, 5,149,335, EP0532002, U.S. Pat. Nos. 5,601,452, 5,562,646, 5,669,894, water-absorbing resins with specific property are proposed as suitable to water absorbing articles such as a diaper having specific property, specific composition or specific polymer concentration.

SUMMARY OF THE INVENTION

Among water-absorbing resins or water absorbing agents which have been developed based on many properties, as described above, those targeted to or with specifications of these properties have also been produced, however, there was a problem that they have not yet satisfactorily fulfilled performance in practical use such as a paper diaper, and the like, even if these properties are controlled.

Therefore, it is an object of the present invention to provide a particulate water absorbing agent suitable to practical use in thin absorbing substrate wherein practically sufficient performance has not yet attained in thin absorbing substrate even by controlling or designing many properties such as water-absorption speed, centrifuge retention capacity, absorbency against pressure, gel strength, durability, soluble content and particle size, although based on which water-absorbing resins or water absorbing agents have been developed and used.

DESCRIPTION OF THE PREFERRED EMBODIMENT(S)

Figure 1:
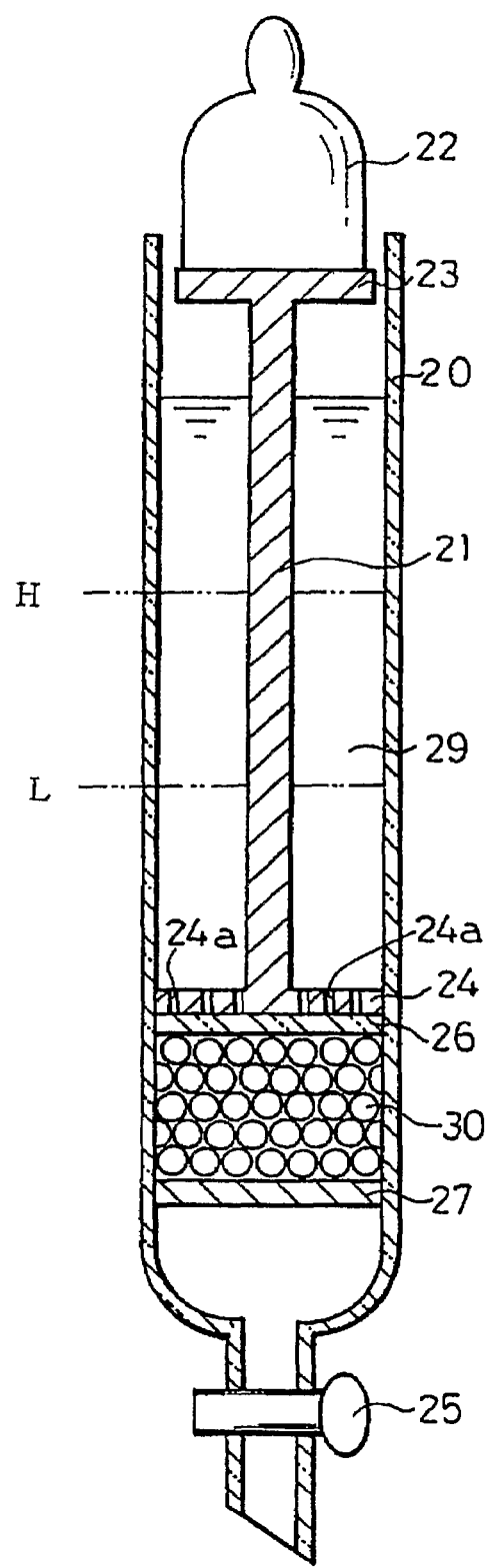
FIG. 1 shows equipment used to measure liquid permeation time under pressure.

Volume of a water-absorbing resin increases after liquid absorption, and thus whole volume of a thin absorbing substrate changes. In a thin absorbing substrate, when this volume change is not uniform or provides rugged form after liquid absorption, it might give uncomfortable feeling to a user or incur leak the liquid because newly discharged liquid flowed along the rugged shape formed on the absorbing substrate before being absorbed by the absorbing substrate. In the present invention it was noticed that volume of a particulate water absorbing agent after liquid absorption increased more than liquid volume absorbed, as a reason for it. Then it has been found that when a particle water-absorbing agent composed by water absorbing resin as a main component and including agglomerated particles, and having irregularly pulverized shape, specific particle size, specific particle size distribution and specific absorption capacity, volume expansion of the water absorbing agent could be suppressed to nearly volume of absorbed liquid, and provided lower ruggedness of an absorbing substrate after liquid absorption practically on applying a thin absorbing substrate.

The present inventors have also found that when the water absorbing agent essentially contains agglomerated particles, liquid permeability underpressure is significantly improved.

Furthermore, the present inventors have also found that when a particulate water absorbing agent is prepared by agglomerating in aqueous liquid such as water while maintaining specified water content, volume resistivity of a water absorbing agent can be reduced. This fact means that the water absorbing agent of the present invention has more conducting properties by the prescribed agglomeration process, static electricity generated by friction of powder of the water absorbing agent can reduce, thereby suppressing the powder scattering caused by static electricity. Therefore, troubles can be suppressed in preparation of a thin absorbing substrate, because the particle water absorbing agent of the present invention has superior handling property.

A particulate water absorbing agent of the present invention is a particulate water absorbing agent having irregularly pulverized shape, which particulate water absorbing agent comprises as a main component a surface crosslinked water-absorbing resin obtained by crosslinking polymerization of an unsaturated monomer having an acid group and/or salts thereof, said particulate water absorbing agent contains agglomerated particles therein, and further said particulate water absorbing agent satisfies (i) to (iii) described below:

(i) centrifuge retention capacity (CRC) of the particulate water absorbing agent in a physiological saline solution being not lower than 32 g/g;

(ii) mass median particle size (D50) of the particulate water absorbing agent being in the range of 200 to 400 μm; and (iii) particles of the particulate water absorbing agent smaller than 600 μm and not smaller than 150 μm being in the range of 95 to 100% by weight.

A method for production of the particulate water absorbing agent with irregularly pulverized shape of the present invention is a method for production of a particulate water absorbing agent having irregularly pulverized shape, which particulate water absorbing agent comprises as a main component a surface crosslinked water-absorbing resin obtained by crosslinking polymerization of an unsaturated monomer having an acid group and/or salts thereof and further via drying and pulverizing steps, and said particulate water absorbing agent contains agglomerated particles therein, which method comprising:

a step of crosslinking polymerization of an aqueous solution of an unsaturated monomer containing a non-neutralized acrylic acid and/or salts thereof in the presence of a crosslinking agent;

a step of further surface crosslinking of a water-absorbing resin particle obtained by the polymerization and said water absorbing resin particle satisfying (i) to (iii) described below:

(i) centrifuge retention capacity (CRC) of the water-absorbing resin particle in a physiological saline solution being not lower than 32 g/g, (ii) mass median particle size (D50) of the water-absorbing resin particle being in the range of 150 to 380 μm, and (iii) the water-absorbing resin particles smaller than 600 μm and not smaller than 150 μm being in the range of 92 to 100% by weight; and a step of further adding aqueous liquid thereto after the surface crosslinking and heating the resin particles while maintaining water content thereof at 1 to 10% by weight and further controlling particle size.

Effects of the Invention

In accordance with a particulate water absorbing agent with irregularly pulverized shape of the present invention, in practical use as a thin absorbing substrate such as a thin diaper, unpleasant feeling can be reduced because an absorbing substrate has few ruggedness, irrespective of liquid absorption. Further, due to high liquid permeability and high absorption speed of the water absorbing agent, leak or Re-wet is less, and due to improvement of surface dryness of thin absorbing articles, Generation of sweatiness or rash on skin of a user can be reduced.

Furthermore, due to little electrostatic charge of a particulate water absorbing agent, handling in production of a thin absorbing substrate is improved.

In addition to these advantages, by limiting mass median particle size of a particulate water absorbing agent within specific range and by limiting ratio of particles smaller than 600 μm and not smaller than 150 μm within specific range, particle diameter distribution becomes mono-dispersed and thus generates little size segregation. As a result, pulsation of periodical change in powder feed amount is suppressed. This has effect of quality stabilization of thin absorbing article produced and easy homogeneous mixing with hydrophilic fibers such as crushed wood pulp.

Best Embodiments to Practice the Invention

Raw materials used for the water-absorbing resin and a particulate water absorbing agent of the present invention and reaction conditions will be explained below. In the present invention, the followings are values obtained by methods described in Examples shown later: (i) centrifuge retention capacity (CRC) in a physiological saline solution, (ii) mass median particle size (D50), (iii) percentage of weight of particles smaller than 600 μm and not smaller than 150 μm, (iv) absorbency against pressure at 1.9 kPa (AAP1.9 kPa) in a physiological saline solution, (v) percentage of particles smaller than 150 μm, (vi) logarithmic standard deviation, (vii) vortex absorption speed, (viii) fluidity after moisture absorption, (ix) decrease ratio of mass median particle size by impact and increase ratio of mass median particle size by agglomeration, (x) bulk density of gel after saturated swelling in a physiological saline solution, (xi) liquid permeation time under pressure, (xii) water content and (xiii) volume resistivity of a water absorbing agent.

(1) A Water-absorbing Resin

A water-absorbing resin of the present invention means a crosslinked polymer which can form hydrogel and is water swelling and non-dissolving in water, for example, water swelling indicates one absorbing large quantity of water in ion exchanged water, such as essentially 5 times or more own weight and preferably 50 to 1000 times. Non-dissolving in water means that soluble content (extractable content) measured and specified by a method for "Equilibrium Extractable Content" in U.S. Reissued 32649 is not lower than 0% by weight and not higher than 50% by weight and further preferably not lower than 0% by weight and not higher than 30% by weight.

As a water-absorbing resin in the present invention, to attain objectives of the present invention, a water-absorbing resin obtained by crosslinking polymerization of an unsaturated monomer containing an acid group and/or salts thereof is essentially used and preferably neutralized polymer of polyacrylic acid obtained by polymerizing and crosslinking of an unsaturated monomer mainly composed of acrylic acid and/or salts thereof is used. Any water-absorbing resin may be used as long as it has crosslinked polymerized structure and it may be a water-absorbing resin obtained by crosslinking reaction with a crosslinking agent after polymerization of an unsaturated monomer containing an acid group and/or salts thereof.

(2) A Water Absorbing Agent (Water Absorbent) and a Production Method Thereof

A water absorbing agent in the present invention is a gelating agent made of a water-absorbing resin as a main component, to absorb aqueous liquid. Aqueous liquid is not limited to water but also includes water containing substance without especially limited, such as urine, blood, excrement, waste liquid, humidity or steam, ice, a mixture of water and organic solvents or inorganic solvents, rain water and underground water, preferably urine and particularly preferably human urine. In the present invention, the water-absorbing resin may be used as it is as a water absorbing agent and additives or water may be contained optionally. Content of a water-absorbing resin in the water absorbing agent is 70 to 100% by weight of the water absorbing agent, preferably 80 to 100% by weight and further preferably 90 to 100% by weight. As other minor components contained, generally water is used as a main or essential component and further additives described later are used.

A method for preparing the water absorbing agent of the present invention has no limitation as long as it can provide satisfying properties mentioned above. A method, for example by controlling specific particle size before surface crosslinking of a water absorbing resin, surface crosslinking and further heating by the addition of water while maintaining water content of the surface crosslinked resin, more specifically, one of the following production methods 1 to 3 can be applied.

Production method 1: A method for a particle water absorbing agent by crosslinking polymerization of an aqueous solution of an unsaturated monomer containing non-neutralized acrylic acid and/or salts thereof as a main component in the presence of a crosslinking agent, drying and pulverizing, adjusting to specific particle size distribution, surface crosslinking of thus obtained water-absorbing resin particles with specific absorption capacity, and then agglomerating to adjust particle size by heating while maintaining water content of 1 to 10% by weight by adding water and classification the obtained agglomerated particles.

Production method 2: A method for a particle water absorbing agent including steps of crosslinking polymerization of an aqueous solution of specific concentration of an unsaturated monomer containing non-neutralized acrylic acid as main components in the presence of a crosslinking agent, neutralization, drying, pulverizing, adjusting to specific particle size distribution, surface-crosslinking thus obtained water-absorbing resin particles with specific absorption capacity, and then agglomerating to adjust particle size by heating while maintaining water content of 1 to 10% by adding water and classifying the obtained agglomerated particles.

Production method 3: A method for a particle water absorbing agent by crosslinking polymerization of an aqueous solution of an unsaturated monomer containing non-neutralized acrylic acid and/or salts thereof as main components in the presence of a crosslinking agent, drying, pulverizing, adjusting to specific particle size distribution, surface-crosslinking thus obtained water-absorbing resin particles with specific absorbency, and then agglomerating to adjust particle size by heating while maintaining water content of 1 to 10% by weight by adding water and classifying the obtained agglomerated particles, wherein a chelating agent is added at one or more timings selected from the group consisting of (i) during polymerization, (ii) after the polymerization and before surface crosslinking, (iii) during surface crosslinking, (iv) during agglomeration.

A production method for the water absorbing agent of the present invention and further the water absorbing agent of the present invention are explained below sequentially.

(3) An Unsaturated Monomer

As an unsaturated monomer composing a water-absorbing resin (hereinafter may be abbreviated simply as a monomer), acrylic acid and/or salt thereof is preferably used as a main component, and they may be used alone or in combination with other monomers to obtain a water-absorbing resin. Such other monomers include, an aqueous or hydrophobic unsaturated monomer such as methacrylic acid, maleic anhydride, maleic acid, fumaric acid, crotonic acid, itaconic acid, vinylsulfonic acid, 2-(meth)acrylamide-2-methylpropane sulfonic acid, (meth)acryloxyalkane sulfonic acid and its alkali metal salt, ammonium salt, N-vinyl-2-pyrrolidone, N-vinylacetamide, (meth)acrylamide, N-isopropyl (meth)acrylamide, N,N-dimethyl(meth)acrylamide, 2-hydroxyethyl (meth) acrylate, methoxypolyethyleneglycol (meth)acrylate, polyethyleneglycol (meth)acrylate, isobutylene, lauryl (meth) acrylate, etc. They may be used alone or in combination of two or more kinds.

When monomers other than acrylic acid (salts) are used in combination, to attain objectives of the present invention, using ratio of the monomer other than acrylic acid (salts) is preferably 0 to 30% by mole based on total amount of acrylic acid and salts thereof, more preferably 0 to 10% by mole and most preferably 0 to 5% by mole.

When an unsaturated monomer containing an acid group is used as a monomer, salts thereof include alkali metal salts, alkaline earth metal salts and ammonium salts, in view of performance, industrial availability and safety of a water-absorbing resin obtained, sodium salts and potassium salts are preferable. An unsaturated monomer containing an acid group such as acrylic acid is preferably neutralized at the acid group in view of property and pH and neutralization ratio of the acid group is usually 20 to 100% by mole, preferably 30 to 95% by mole and more preferably 40 to 80% by mole. Neutralization of the acid group may be performed in an aqueous solution containing a monomer or may be performed after obtaining a polymer as shown in the production method 2 or they may be used in combination.

(4) An Internal Crosslinking Agent

A water-absorbing resin used in the present invention is a crosslinked polymer and crosslinked structure may be formed as self-crosslinked type without using a crosslinkable monomer or crosslinked-type with internal crosslinking agent such as so to speak a crosslinkable monomer may be used. In view of property, it is preferable to copolymerize or react an internal crosslinking agent having not less than 2 polymerizable unsaturated groups or not less than 2 reactable groups in a molecule. A water absorbing agent becomes insoluble to water due to being a crosslinked polymer.

Specific examples of these internal crosslinking agents include, for example, N,N'-methylenebis(meth)acrylamide, (poly)ethyleneglycol di(meth)acrylate, (poly) propyleneglycol di(meth) acrylate, trimethylolpropane tri(meth)acrylate, glycerine tri(meth)acrylate, glycerine acrylate methacrylate, ethylene oxide modified trimethylolpropane tri(meth)acrylate, pentaerythritol tetra(meth)acrylate, triallyl cyanurate, triallyl isocyanurate, triallyl phosphate, triallylamine, poly (meth)allyloxyalkane, (poly)ethyleneglycol diglycidyl ether, glycerol diglycidyl ether, ethyleneglycol, polyethyleneglycol, propyleneglycol, glycerine, pentaerythritol, ethylenediamine, ethylene carbonate, propylene carbonate, polyethyleneimine, glycidyl (meth)acrylate, etc.

These internal crosslinking agents may be used alone or in a mixture of two or more kinds, as appropriate. These internal crosslinking agents may be added as a whole into a reaction system or in portion wise. When at least one kind or not less than 2 kinds of internal crosslinking agents are used, in consideration of absorption properties of a water-absorbing resin or a water absorbing agent finally obtained, it is preferable to use essentially a compound having not less than two polymerizable unsaturated groups, in polymerization.

Using amount of these internal crosslinking agents is preferably in the range of 0.001 to 2% by mole based on the unsaturated monomer (excluding the internal crosslinking agents), more preferably 0.005 to 0.5% by mole, further preferably 0.01 to 0.2% by mole and particularly preferably 0.03 to 0.15% by mole. The using amounts of the internal crosslinking agents less than 0.001% by mole and over 2% by mole may not provide sufficient absorption properties.

When crosslinked structure is introduced inside a polymer by using the internal crosslinking agent, the internal crosslinking agent may be added to a reaction system before, during or after polymerization of the monomer or after neutralization.

(5) A polymerization Initiator

An initiator used in polymerization of a monomer to obtain a water-absorbing resin used in the present invention includes a radicalpolymerization initiator such as potassium persulfate, ammonium persulfate, sodium persulfate, potassium peracetate, sodium peracetate, potassium percarbonate, sodium percarbonate, tert-butyl hydroperoxide, hydrogen peroxide, 2,2'-azobis(2-amidinopropane) dihydrochloride, etc: photopolymerization initiators such as 2-hydroxy-2-methyl-1-phenylpropane-1-one, etc. Using amount of the polymerization initiator is, in view of property, 0.001 to 2% by mole, preferably 0.01 to 0.12% by mole (based on total monomers). When the using amount of the polymerization initiator is less than 0.001% by mole, unreacted residual monomers increase, while, the amount of the polymerization initiator is over 2% by mole, polymerization control becomes difficult and thus not preferable.

(6) A Polymerization Method

In the present invention, bulk polymerization or precipitation polymerization may be carried out, however, in view of property, aqueous solution polymerization or reversed phase suspension polymerization carried out in aqueous solution of the monomer is preferable. Monomer concentration in the aqueous solution (hereinafter referred to as a monomer aqueous solution), when an aqueous solution of the monomer is prepared, is determined by temperature of the aqueous solution or the monomer and not especially limited, however, preferably 10 to 70% by weight, and further preferably 20 to 60% by weight. When aqueous solution polymerization is carried out, a solvent other than water may also be used, if necessary, and solvent type used in combination is not especially limited. Crashing may be carried out after polymerization, if necessary.

Polymerization is started using the polymerization initiator. An activated energy ray such as UV ray, electron beam or γ-ray may be used other than the polymerization initiator as it is or in combination with the polymerization initiator. Polymerization temperature depends on type of the polymerization initiator used, however, is preferably in the range of 15 to 130° C. and more preferably in the range of 20 to 120° C.

Reversed phase polymerization is a method for polymerization by suspending a monomer aqueous solution in a hydrophobic organic solvent, and described, for example, in U.S. Pat. Nos. 4,093,776, 4,367,323, 4,446,261, 4,683,274, 5,244,735, etc. Aqueous solution polymerization is a method for polymerization of a monomer aqueous solution without using a dispersing solvent, and described, for example, in U.S. Pat. Nos. 4,625,001, 4,873,299, 4,286,082, 4,973,632, 4,985,518, 5,124,416, 5,250,640, 5,264,495, 5,145,906, 5,380,808, EP0811636, EP0955086, EP0922717, etc. Monomers or polymerization initiators exemplified in these polymerization methods are also applicable to the present invention.

A water absorbing resin of the present invention has, as described above, neutralization degree of acid groups of generally 20 to 100% by mole, but in a polymerization process of an unsaturated monomer, the unsaturated monomer may be polymerized as not-neutralized state and neutralized after polymerization, or polymerization may be carried out using the unsaturated monomer neutralized in advance. Therefore, neutralization degree of the unsaturated monomer in the monomer aqueous solution may be in any range of 0 to 100% by mole. Among these, in the production method 1 or the production method 3 may also be neutralization polymerization and polymerization can be carried out using the monomer aqueous solution with neutralization degree of 30 to 100% by mole, preferably 40 to 95% by mole and more preferably 50 to 85% by mole. Neutralization embodiments include to initiate polymerization using the non-neutralized unsaturated monomer, followed by neutralization in the midst of polymerization; to polymerize using the unsaturated monomer neutralized in advance to the above range; and to neutralize further in the midst of polymerization, all of which providing polymerization of the unsaturated monomer neutralized finally, and the neutralization degree means value at the start of polymerization.

On the other hand, so to speak a method for acid polymerization, followed by neutralization may be adopted, wherein the non-neutralized unsaturated monomer containing an acid group, in particular, non-neutralized acrylic acid as a main component is polymerized, followed by neutralization of the acid group. This corresponds to the production method 2. That is, the production method 2 of the present invention is a method for crosslinking polymerization of specific concentration of the unsaturated monomer aqueous solution with non-neutralized acrylic acid as a main component in the presence of a crosslinking agent, followed by neutralization, adjustment to specific particle size and further surface crosslinking of thus obtained water-absorbing resin particles with specific absorption capacity. In the production method 2, non-neutralized acrylic acid is a main component and after crosslinking polymerization using a non-neutralized acrylic acid monomer in the range of preferably 30 to 100% by mole, more preferably 90 to 100% by mole and particularly preferably 100% by mole, followed by the addition of an alkali metal salt for post neutralization to provide partial alkali metal base to be used as a water-absorbing resin of the present invention. When a water-absorbing resin obtained by this polymerization method is used as a water absorbing agent of the present invention, it is possible to obtain an absorbing substrate with high absorbing ability and superior stability to urine. When the non-neutralized unsaturated monomer is polymerized, using amount of an internal crosslinking agent tends to be able to increase, and deterioration resistance to urine can be improved by increase in crosslink density.

In the present invention, other polymerizable monomers can be used with acrylic acid, if necessary. Specific other polymerizable monomers, internal crosslinking agents, types of polymerization initiators, additives, and the like are the same as described in the content of the items (3), (4) and (5). In the production method 2, concentration of a polymerizable monomer, when a solvent is used, is not especially limited, however, is as low as generally 5 to 30% by weight and preferably 10 to 30% by weight and initiation temperature of polymerization of aqueous monomer solution is preferably as low as 10 to 25° C.

Alkali metal compounds used to neutralize an acid group in the unsaturated monomer containing an acid group or in a polymer obtained to provide a partial alkali metal base include alkali metal hydroxide (sodium hydroxide, potassium hydroxide, lithium hydroxide, etc.), alkali metal carbonate (sodium carbonate, potassium bicarbonate, etc.), etc. In view of performance, industrial availability and safety of a water-absorbing resin obtained, sodium salts and potassium salts are preferable among them. In the present invention, 50 to 90% by mole, preferably 60 to 80% by mole of acid groups in a polymer are converted to alkali metal salts by neutralization reaction with an alkali metal compound.

In the production method 2, a polymer after polymerization is essentially neutralized. A method for neutralization of a polymer with an alkali metal compound includes, when polymerization is carried out using a solvent, one wherein an aqueous solution of an alkali metal compound is added, while cutting a gel-like polymer obtained to small pieces of not larger than about 1 cm$^3$, followed by further mixing the gel with a kneader or a meat chopper. Neutralization temperature to obtain the water absorbing agent of the present invention is 50 to 100° C., preferably 60 to 90° C. and neutralization is preferably performed so that homogeneity of not larger than 10 as represented by the first neutralization index (specified by neutralization degree of 200 particles) described in claim 1 of U.S. Pat. No. 6,187,872.

(7) A Chain Transfer Agent

In the present invention, a chain transfer agent may be used in polymerization. By polymerization in the presence of an aqueous chain transfer agent in addition to the unsaturated monomer, inner crosslinking agent and polymerization initiator, and when a water-absorbing resin thus obtained is used as a water absorbing agent of the present invention, an absorbing substrate with high absorbing ability and superior stability to urine can be obtained. When the chain transfer agent is used in combination, using amount of the inner crosslinking agent can be increased, as a result deterioration resistance to urine can be improved by increase in crosslink density. The aqueous chain transfer agent used for polymerization in the present invention is not especially limited as long as it dissolves in water or an aqueous ethylenic unsaturated monomer and includes thiols, thiolates, secondary alcohols, amines, hypophosphites (salts), etc. Specifically, mercaptoethanol, mercaptopropanol, dodecyl mercaptan, thioglycols, thiomalic acid, 3-mercaptopropionic acid, isopropanol, sodium phosphite, potassium phosphite, sodium hypophosphite, formic acid and their salts are used, and one kind or not less than 2 kinds selected from the group can be used. In view of the effect, phosphorous compounds, in particular, hypophosphite salts such as sodium hypophosphite are preferably used.

Using amount of the aqueous chain transfer agent depends on kind of the aqueous chain transfer agent and concentration of a monomer aqueous solution, however, is 0.001 to 1% by mole based on total monomers and preferably 0.005 to 0.3% by mole. The using amount less than 0.001% by mole provides no effect of chain transfer agents. On the other hand, the using amount over 1% by mole increases water soluble content and lowers stability on the contrary and thus not preferable. The chain transfer agent may be added by dissolving in a monomer aqueous solution before polymerization or sequentially in the midst of polymerization.

(8) Drying

The crosslinked polymer obtained by the above polymerization methods is a hydrated gel-like crosslinked polymer, which may be crushed, if necessary, and further dried. Drying is carried out generally at temperature range of 60 to 250° C., preferably 100 to 220° C. and more preferably 120 to 200° C. as heating medium temperature. Drying time depends on surface area and water content of a polymer and a dryer type and is selected to obtain objective water content. In the present invention, a crosslinked polymer after drying is called a water-absorbing resin.

Water content of a water-absorbing resin used in the present invention is not especially limited, however, it is selected so as to provide a particle exhibiting fluidity even at room temperature and powder state with water content of more preferably 0.2 to 30% by weight, further preferably 0.3 to 15% by weight and particularly preferably 0.5 to 10% by weight. Too high water content not only impairs fluidity and thus affects production but also makes pulverization of a water-absorbing resin impossible and may lose control to specific particle size distribution. Water content of a water-absorbing resin is specified as amount of water contained in the water-absorbing resin, measured by weight loss in drying at 180° C. for 3 hours.

As a drying method used, various methods can be adopted, so that objective water content is obtained, including heat drying, hot air drying, reduced pressure drying, infrared ray drying, microwave drying, dehydration by azeotrope with a hydrophobic organic solvent and high-humidity drying using high temperature steam, however, not especially limited.

Shape of a water-absorbing resin of the present invention obtained by the above production methods is not especially limited, as long as it is suitable to be treated as powder and includes spherical, fibrous, rod, nearly spherical, flat, irregular, agglomerated particulate, porous-structured particles, however, irregularly pulverized one obtained by a pulverizing process after aqueous solution polymerization or reversed phase polymerization are essentially used. Although particles with irregularly pulverized shape are essentially used, other particles, for example, spherical particles can be partially contained. In this case, content of particles with irregularly pulverized shape is 70 to 100% by weight, more preferably 85 to 100% by weight and particularly preferably 95 to 100% by weight. Particles with irregularly pulverized shape obtained via pulverizing process can essentially be used.

(9) Pulverization, Classification and Particle Size Control and Absorption Capacity A water-absorbing resin used in the present invention is adjusted preferably to have specific particle size.

Generally, when it is tried to obtain particles with mass median particle size as smaller as possible, ratio of fine particles (for example, particles smaller than 106 μm) tend to increase, however, by combination of a pulverizing method and classification described later, and further with recovery of fine water-absorbing resin particles, a water-absorbing resin controlled to have specific particle diameter can be obtained in high yield.

A pulverizer used to obtain particles having irregularly pulverized shape and the following controlled objective particle diameter, obtained by a pulverizing process, includes those classified as a shear rough pulverizer, an impact powder pulverizer and high speed rotation type powder pulverizer, among pulverizer type names classified in Table 2.10 of "Powder Engineering Handbook" (Edited by The Association of Powder Engineering: first version) and such types as having at least one powder pulverizing mechanism among cutting, shearing, impact and friction are preferably used and in particular, a pulverizer with cutting or shear mechanism as main mechanism is preferable. In addition to these, even those classified to a roll rotation type and a roll mill (roll rotation type) having compression mechanism as pulverizing mechanism can be used, if they have strong shear and cutting effect. Among the preferable pulverizer, such equipment for shear pulverizer by multiple rotating blades against a fixed blade is preferable. Peripheral speed of the rotating blades is preferably 3.0 to 200 m/sec, more preferably 5.0 to 150 m/sec. Such pulverizer by high speed rotation blades can not only provide high pulverizing efficiency and superior productivity but also decrease generation of fine powder of the water absorbing agent.

In the present invention, by pulverizing a dried water-absorbing resin with water content in the range of 0.2 to 30% by weight with the powder pulverizer, generation of fine particles smaller than 150 μm can be suppressed to the minimum and operation in high productivity can be performed. Further, by combining with recovery technology of fine water-absorbing resin powders described later, the following preferable particle diameter of present invention can be attained.

Particle diameter of a water-absorbing resin used in the present invention to obtain a water absorbing agent of the present invention is usually controlled finely in small range of 150 to 380 μm, preferably 180 to 360 μm, more preferably 200 to 340 μm and particularly preferably 220 to 320 μm, as mass median particle size (specified by sieve classification), and ratio of particles with diameter of lower than 150 μm is controlled to be 0 to 8% by weight, preferably 0 to 5% by weight and more preferably 0 to 2% by weight.

Bulk density (specified by JIS K-3362-1998) of a water-absorbing resin of the present invention to obtain a water absorbing agent of the present invention is adjusted to be in the range of preferably 0.40 to 0.90 g/ml and more preferably 0.50 to 0.80 g/ml. Ratio of particles with diameter of smaller than 600 μm and not smaller than 150 μm is preferably 92 to 100% by weight in whole particles, more preferably 95 to 100% by weight and further more preferably 98 to 100% by weight. Ratio of particles with diameter of smaller than 500 μm and not smaller than 150 μm is preferably 90 to 100% by weight in whole particles, more preferably 92 to 100% by weight and further more preferably 93 to 100% by weight. Logarithmic standard deviation (σζ) of particle size distribution is controlled preferably to be 0.20 to 0.40, more preferably 0.20 to 0.38 and particularly preferably 0.20 to 0.36.

A water-absorbing resin thus obtained in the present invention is adjusted to have the above particle size and preferably centrifuge retention capacity (CRC) in a physiological saline solution before surface crosslinking is controlled to be not lower than 32 g/g, more preferably 35 to 70 g/g, further preferably 40 to 65 g/g and particularly preferably 45 to 65 g/g. Absorption capacity can be controlled by formulating specific amount of an inner crosslinking agent to an aqueous solution of an unsaturated monomer or by controlling the polymerization conditions or drying conditions.

(10) Recovery and Regeneration of Fine Water-absorbing Resin Particles

In the present invention, as means to control to small particle diameter and reduce amount of fine particles (particles below 150 μm) although contradictory each other, for example, recovery and regeneration of fine particles are carried out.

Fine water-absorbing resin particles (for example, particles smaller than 106 μm) taken out by the pulverization and classification of the above Item (9) can be regenerated to objective water-absorbing resin particles by returning to a monomer solution used for re-polymerization or mixing with large quantity of hot water (weight ratio of fine water-absorbing resin particles and hot water: from 5:4 to 3:7) to return to hydrated gel-like substance again, followed by drying and pulverizing, etc. These techniques are exemplified in U.S. Pat. Nos. 6,228,930, 5,264,495, 4,950,692, 5,478,879 and EP844270. By recovery and regeneration of particles out of objective range, waste amount can be reduced.

By combination of a pulverization method and classification in accordance with the present invention and further recovery and regeneration of fine water-absorbing resin particles, water-absorbing resin particles can be obtained in yield of preferably not lower than 80% by weight and not higher than 100% by weight as solid base relative to weight of monomer fed, further preferably not lower than 90% by weight and not higher than 100% by weight and most preferably not lower than 95% by weight and not higher than 100% by weight, wherein the solid (weight %) is a value calculated by subtracting water content (mass %) from 100 mass %. Particles obtained by recovery of the fine water-absorbing resin particles have high particle strength equivalent to that of particles obtained by polymerization, drying and pulverization. A water-absorbing resin thus recovered and regenerated is generally subjected to pulverization, classification and particle size control after mixing with a water-absorbing resin obtained by the drying process (8).

(11) Surface Crosslinking Treatment

The water-absorbing resin of the present invention may be, as represented by the production methods 1 to 3, one with specific absorbency obtained by adjustment to specific particle size distribution, followed by further surface crosslinking. The water-absorbing resin used in the present invention has centrifuge retention capacity (CRC) lowered, for example by surface crosslinking, to generally 50 to 95% of centrifuge retention capacity (CRC) before surface crosslinking and further to 60 to 90%. Lowering of centrifuge retention capacity can be adjusted by type and amount of a crosslinking agent, reaction temperature and time, as appropriate.

The surface crosslinking treatment in the present invention means operation to increase crosslink density at near surface of a particle than that inside the particle. More specifically, it is an operation to form new crosslink by the addition, onto particle surface, of a compound (a surface crosslinking agent) having at least two functional groups in a molecule, which can form bonding by reaction with an acid group or salts thereof (for example a carboxyl group or salts thereof) contained in a particulate water-absorbing resin.

By performing such surface crosslinking, absorbency against pressure and liquid permeability under pressure described later can be improved, and thus it is particularly preferable.

A surface crosslinking agent used in the present invention is not especially limited, however, for example, those exemplified in U.S. Pat. Nos. 6,228,930, 6,071,976, 6,254,990, and the like can be used and includes, for example, polyhydric alcohols such as mono, di-, tri-, tetra- or polyethyleneglycol, mono propyleneglycol, 1,3-propanediol, dipropyleneglycol, 2,3,4-trimethyl-1,3-pentanediol, polypropyleneglycol, glycerin, polyglycerin, 2-butene-1,4-diol, 1,4-butanediol, 1,3-butanediol, 1,5-pentanediol, 1,6-hexanediol, 1,2-cyclohexanedimethanol, etc.; epoxy compounds such as ethyleneglycol diglycidyl ether, glycidol, etc.; polyvalent amine compounds such as ethylenediamine, diethylenetriamine, triethylenetetramine, tetraethylenepentamine, pentaethylenehexamine, polyethyleneimine, polyamide-polyamine, etc.; haloepoxy compounds such as epichlorohydrin, epibromohydrin, α-methylepichlorohydrin, etc.; condensates of the polyvalent amine compounds and the haloepoxy compounds; oxazolidinone compounds such as 2-oxazolidinone, etc.; cyclic urea; alkylene carbonate compounds such as ethylene carbonate, etc. They may be used alone or in combination of two or more kinds. To sufficiently exert effects of the present invention, it is preferable to essentially use a polyvalent alcohol among these surface crosslinking agents. As a polyvalent alcohol, one having carbon atoms of 2 to 10 is preferable and one having carbon atoms of 3 to 8 is more preferable.

Using amount of a surface crosslinking agent depends on compounds used or combination thereof, however, is preferably in the range of 0.001 to 10% by weight based on the water-absorbing resin and more preferably in the range of 0.01 to 5% by weight.

In surface crosslinking in the present invention, water is preferably used as a solvent. In this case, using amount of water depends on water content of a water-absorbing resin used, however, is preferably in the range of 0.2 to 20% by weight based on the water-absorbing resin and more preferably in the range of 0.3 to 10% by weight. A hydrophilic organic solvent other than water may be used. When a hydrophilic organic solvent is used, using amount thereof is preferably in the range of 0 to 10% by weight based on the water-absorbing resin, more preferably in the range of 0 to 5% by weight and further preferably in the range of 0 to 3% by weight.

In surface crosslinking in the present invention, a preferable method is premixing of a surface crosslinking agent in water and/or a hydrophilic organic solvent, followed by spraying or drop-wise addition of the solution to a water-absorbing resin and the spraying method is more preferable. Droplet size to be sprayed is, as average particle diameter, preferably in the range of 0.1 to 300 μm and more preferably in the range of 0.1 to 200 μm.

Mixing equipment to be used in mixing a water-absorbing resin, a crosslinking agent and water or a hydrophilic organic solvent is preferably one with strong mixing force to uniformly and surely mix them. Suitable mixing equipment includes, for example, a cylinder type mixer, a double wall conical mixer, a high speed agitation type mixer, a V-shaped mixer, a ribbon type mixer, a screw type mixer, a double-arm kneader, a crashing type kneader, a rotation type mixer, an air-flow type mixer, a turbulizer, a batch type Lödige mixer, a continuous type Lödige mixer, etc.

A water-absorbing resin after the addition of the surface crosslinking agent is preferably subjected to heat treatment. Heating temperature (temperature of heating medium or temperature of material) is preferably in the range of 100 to 250° C., more preferably in the range of 150 to 250° C. and heating time is preferably in the range of 1 minute to 2 hours. A suitable combination example of heating temperature and heating time is 180° C. for 0.1 to 1.5 hour and 200° C. for 0.1 to 1 hour. A particulate water-absorbing resin can be obtained by these processes.

(12) Agglomeration

To obtain a particulate water absorbing agent of the present invention, agglomeration process is carried out.

Agglomeration process includes adding aqueous liquid to water absorbing resin after surface crosslinking treatment, then heating, while maintaining water content of 1 to 10% by weight, and further, if necessary, adjusting particle size in specific range.

Aqueous liquid to be added may be water as it is or may contain other additives such as a chelating agent described later, a component made from plant, an antimicrobial, an aqueous polymer, an inorganic salt, etc. Content of the additives is in the range of 0.001 to 50% by weight in an aqueous solution, more preferably 0.001 to 30% by weight and most preferably 0.01 to 10% by weight.

In the present invention, agglomeration is preferably performed by a method for spraying or drop-wisely addition of an aqueous solution to a water-absorbing resin, and a spraying method is more preferable. Droplet size to be sprayed is, as average particle diameter, preferably in the range of 0.1 to 300 μm and more preferably in the range of 0.1 to 200 μm.

As agglomerating equipment to be used, those having strong mixing force are preferable, including a cylinder type mixer, a double wall conical mixer, a high speed agitation type mixer, a V-shaped mixer, a ribbon type mixer, a screw type mixer, a double-arm kneader, a crashing type kneader, a rotation type mixer, an air-flow type mixer, a turbulizer, a batch type Lödige mixer, a continuous type Lödige mixer, etc.

It is preferable to heat mixture obtained from mixing with water absorbing resin and aqueous liquid, while maintaining water content of the mixture. In general, the addition of water to a water-absorbing resin increases stickiness, however, by heating while maintaining water content, fluidity of powder is recovered by vanishing the stickiness and thus it can simplify production process and shorten production time. The heating process is called curing process in the present invention. Heat treatment is performed, in view of agglomeration ratio or agglomeration strength, by maintaining water content (specified by weight loss in drying at 180° C. for 3 hours) of a water-absorbing agent, at 1 to 10% by weight, more preferably at 2 to 8% by weight and further preferably at 2.5 to 6% by weight. Heating medium such as hot air can be used in heating and heating temperature (temperature of heating medium or temperature of material) is preferably in the range of 40 to 120° C., more preferably in the range of 50 to 100° C. and heating time is preferably in the range of 1 minute to 2 hours. Heating temperature is expressed by temperature of heating medium in many cases. A suitable combination example of heating temperature and heating time is 60° C. for 0.1 to 1.5 hour and 100° C. for 0.1 to 1 hour. Heating and the addition of water may be carried out by the same equipment or by separate equipment. Heating may be carried out while stirring or standing still (without stirring), as long as temperature or water content can be controlled, but heating while standing still (without stirring) is preferable, thereby curing the particles (binding softly and forming as a block). A more preferable method is heating a mixture obtained from mixing with water and water absorbing resin, while the mixture was heaped in the range of 1 to 100 cm in height, more preferably 5 to 80 cm in height, and particularly preferably 10 to 70 cm in height. A cured water-absorbing agent is then subjected to adjusting particle size and preferably further classification to obtain an objective agglomerated particle of the present invention.

Adjusting particle size here is an operation conceptually similar to pulverization, however, it is not a process to give such strong energy to destruct primary particles but a process carried out under weak energy only to adjust agglomerated particles to have particle size distribution required. Suitable equipment includes a flash mill, a roll granulator, etc.

In such agglomeration of the present invention, only water or an aqueous solution with water as a main component (60 to 100%) is mixed as a binder, followed by heating for curing, therefore it is not only safe but also provides a superior absorbing substrate due to destruction of agglomerates to suitable degree in practical use and control of reduction of mass median particle size by impact described later, possible in the range of the present invention.

According to conventionally known technology, agglomeration technologies of a water-absorbing resin particle with aqueous liquid have been disclosed in such as JP-A-61-97333 and WO91/17200. However, in these conventionally known technologies, not only improvement effect of agglomerating on liquid permeability is not confirmed, due to no control of particle size and high amount of fine particles are contained but also segregation is easily happen due to too big decrease ratio of mass median particle size by impact and wide particle size distribution, therefore they have problems of too significantly poor performance, when applied to a practical thin absorbing substrate. They are different from the present invention in fundamental concept.

In general, shape of a water-absorbing resin includes, for example, spherical and/or elliptical or Vienna sausage-like primary particle shape obtained by reversed phase suspension polymerization described in FIGS. 1 and 2 of U.S. Pat. No. 5,244,735; the granulated primary particles of agglomerated spherical and/or elliptical particles such as agglomerated beads described in FIG. 1, page 75 of "NONWOVENS WORLD October-November 2000" (published from Marketing Technology Service, Inc.); melt welded granulated particles during polymerization described in JP-A-11-5808; irregularly pulverized shape derived from pulverized particles of a hydrated gel-like polymer obtained by polymerization of a monomer solution, such as "Crystals" in FIGS. 2, 3 and 4 of U.S. Pat. No. 5,981,070 or in FIG. 1, page 75 of "NONWOVENS WORLD October-November 2000". In the present invention, "a particle with irregularly pulverized shape" is a particle obtained by drying and pulverizing of a hydrated polymer obtained by aqueous solution polymerization, and the like and it is a particle whose pulverized surface (smooth surface) and corners generated by pulverization are confirmed using an electron microscope or an optical microscope.

A water-absorbing agent in the present invention is a particle with irregularly pulverized shape and contains agglomerated particles of a particle with irregularly pulverized shape. An agglomerated particle in the present invention means one particle formed by assembly of multiple water-absorbing resin particles. Diameter of each particle composing an agglomerated particle is recognized to be in the range of 50 μm to 600 μm and particles smaller than 50 μm may be included in the agglomerated particle naturally. Morphology of the agglomerated particle includes; formation of one particle by assembly of fine particles themselves with about 50 μm to 150 μm; fine particles with about 50 μm to 150 μm adhered at the peripheral of a large particle with 200 μm to 600 μm; and assembly of 2 or more large particle with 150 μm to 300 μm, etc. The morphology can be judged by observation using an electron microscope or an optical microscope. Properties of a water absorbing agent containing the agglomerated particle is judged whether decrease ratio of mass median particle size by impact to be described later is in specific range or not. In the present invention, "agglomerated particle with irregularly pulverized shape" is multiply bonded state of primary particles obtained by drying and pulverizing of a hydrated polymer obtained by aqueous solution polymerization, and the like and it is a particle whose pulverized surface (smooth surface) and corners generated by pulverization are confirmed in the primary particle using an electron microscope or an optical microscope. Conventionally, it was difficult to produce a particle with irregularly pulverized shape having small particle diameter and narrow distribution of mass median particle size in high yield due to being subjected to pulverizing process. Effect of agglomeration by aqueous liquid shown by the present invention is particularly evident in this particle with irregularly pulverized shape.

In a particulate water absorbing agent of the present invention, weight ratio of the agglomerated particle is preferably not lower than 10% by weight and not higher than 100% by weight in a particulate water absorbing agent, further preferably not lower than 30% by weight and not higher than 100% by weight, further particularly preferably not lower than 50% by weight and not higher than 100% by weight and most preferably not lower than 70% by weight, that is a main component. In a particulate water absorbing agent of the present invention, weight ratio of the agglomerated particle is determined by selecting agglomerated and non-agglomerated particles using a microscope and by ratio thereof.

Particle diameter of a particulate water absorbing agent with irregularly pulverized shape of the present invention is controlled as narrow as generally 200 to 400 μm, preferably 225 to 380 μm, more preferably 250 to 350 μm, most preferably 250 to 330 μm, as mass median particle size and ratio of particles smaller than 150 μm is controlled to 0 to 5% by weight, preferably 0 to 4% by weight, more preferably 0 to 3% by weight, especially 0 to 2% by weight, and most preferably 0 to 1% by weight.

In agglomerating process of the present invention, increase ration of mass median particle size of a particulate water absorbing agent with irregularly pulverized shape of the present invention, obtained by agglomeration process, is preferably controlled to 5 to 30% relative to mass median particle size of a water-absorbing resin used in the present invention, more preferably 7 to 25% and further preferably 9 to 20%, as increasing ratio.

Bulk density (specified by JIS K-3362-1998) of a particulate water-absorbing agent of the present invention is adjusted to be in the range of preferably 0.40 to 0.90 g/ml and more preferably 0.50 to 0.80 g/ml. Ratio of particles with diameter of between 150 μm to 600 μm of a particulate water absorbing agent of the present invention is preferably 90 to 100% by weight in whole particles, more preferably 95 to 100% by weight and further more preferably 98 to 100% by weight. Logarithmic standard deviation ($\sigma\zeta$) of particle size distribution of a particulate water absorbing agent of the present invention is controlled preferably to be 0.2 0 to 0.50, more preferably 0.20 to 0.45 and particularly preferably 0.20 to 0.40.

(13) Addition of a Chelating Agent

To a particulate water absorbing agent of the present invention, a chelating agent, in particular, a polyvalent carboxylic acid and salts thereof can be formulated.

A production method 3 of the present invention, in particular, is a method for a particle water absorbing agent by crosslinking polymerization of an aqueous solution of an unsaturated monomer containing non-neutralized acrylic acid and/or salts thereof as main components in the presence of a crosslinking agent, drying, pulverizing, adjusting to specific particle size distribution, surface-crosslinking thus obtained water-absorbing resin particles with specific absorbency, and agglomerating to adjust particle size by heating while maintaining water content of 1 to 10% by weight by adding water and classifying the obtained agglomerated particles, wherein a chelating agent is added at one or more timings selected from the group consisting of (i) during polymerization, (ii) after the polymerization and before surface crosslinking, (iii) during surface crosslinking, (iv) during agglomeration.

The chelating agent used in a water absorbing agent of the present invention is preferably one with high blocking ability or chelating ability for Fe or Cu ion, specifically, one with stability constant for Fe ion of not lower than 10, preferably not lower than 20, further preferably an amino polyvalent carboxylic acid and salts thereof and particularly preferably aminocarboxylic acid with not less than 3 carboxyl groups and salts thereof.

These polyvalent carboxylic acids specifically include diethylenetriamine pentaacetic acid, triethylenetetramine hexaacetic acid, cyclohexane-1,2-diamine tetraacetic acid, N-hydroxyethyl ethylenediamine triacetic acid, ethyleneglycol diethylether diamine tetraacetic acid, ethylenediamine tetra propionic acetic acid, N-alkyl-N'-carboxymethyl aspartic acid, N-alkenyl-N'-carboxymethyl aspartic acid and alkaline metal salts thereof; alkaline earth metal salts thereof; ammonium salts thereof or amine salts thereof. They may be used alone or in combination of two or more kinds. Among these, diethylenetriamine pentaacetic acid, triethylenetetramine hexaacetic acid, N-hydroxyethyl ethylenediamine triacetic acid and salts thereof are most preferable.

Using amount of the chelating agent, in particular, the amino polyvalent carboxylic acid is as small as generally 0.00001 to 10 parts by weight based on 100 weight parts of a water-absorbing resin, a main component, and preferably 0.0001 to 1 weight parts. The using amount over 10 parts by weight is not only uneconomical due to failure to get enough effect relative to using amount but also incurs a problem of reducing absorption capacity. On the other hand, the using amount less than 0.00001 part by weight does not provide sufficient addition effect.

By the addition of such a chelating agent, time course decomposition of a water absorbing agent, which is derived from a reaction between components in urine and Fe iron, can be suppressed, which in turn can suppress solubilization of a water absorbing agent, decrease in absorbency of a water absorbing agent and decrease in liquid permeability of a water absorbing agent.

In the case of the addition of the chelating agent during polymerization, the chelating agent may be dissolved to an aqueous solution of an unsaturated monomer, followed by polymerization or it may be added in the midst of polymerization. It may be added to a gel-like crosslinked polymer or a water-absorbing resin obtained. To add the chelating agent during surface crosslinking, surface crosslinking may be performed using a solution containing the surface crosslinking agent added with the chelating agent. Further, in the case of adding the chelating agent after surface crosslinking, water dissolved with the chelating agent may be sprayed in agglomeration process, followed by heating while maintaining water content at 1 to 10% by weight.

(14) Other Additives

In the present invention, the following (A) a component made from plant, (B) a polyvalent metal salt of organic acid, (C) an inorganic fine particle (including (D) composite hydrated oxides) may be added as a minor component in addition to the chelating agent, by which various functions can be furnished to a water-absorbing agent of the present invention. The addition methods include, in the case that the additives are solutions, an embodiment to add as a solution, as a water dispersion or as it is; while in the case that the additives are powders, non-soluble in water, an embodiment to add as a water dispersion or as it is; and in the case that the additives are soluble in water, the same embodiments as in the case of the solutions.

Using amount of these (A) to (D) and (E) other additives depends on objectives or function to be furnished, however, is usually, as the amount of one kind of additive, 0 to 10 parts by weight based on 100 parts by weight of a water-absorbing agent, preferably 0.001 to 5 parts by weight and further preferably 0.002 to 3 parts by weight. The using amount less than 0.001 part by weight usually does not provide sufficient effect or additional function, while the using amount over 10 part by weight may not get effect matching to the added amount or may incur lowering of absorption performance.

(A) A Component Made from a Plant

A water absorbing agent of the present invention can be formulated with a component made from plant in the amount described above to fulfill deodorization effect. The component made from a plant to be used in the present invention are preferably at least one compound selected from polyphenol, flavone, derivatives thereof and caffeine. It is further preferable that the plant component is at least one kind selected from tannin, tannic acid, stachyurus praecox, gallnut or gallic acid.

A plant containing the above component to be used in the present invention include, as in EP1352927 and WO2003/104349, for example, Theaceae plant such as camellia, Hikasaki plant, and Sprague; Gramineae plant such as rice plant, sasa-bamboo, bamboo, corn, wheet, etc.; and Rubiaceae plant such as coffee.

Form of the component made from a plant to be used in the present invention includes plant extract (essential oil), plant itself (plant milled powder), plant residue or extract residue as by-products in production processes of plant processing industry or foods processing industry, however, not limited thereto.

(B) A polyvalent metal salt

A water absorbing agent of the present invention may be formulated with a polyvalent metal salt, in particular, a polyvalent metal salt of organic acid in the amount described above to improve powder fluidity in dry state and after moisture absorption.

A polyvalent metal salt of an organic acid used and a methods for mixing the polyvalent metal salts are exemplified in WO PCT/2004/JP1355, and the polyvalent metal salt of an organic acid used in the present invention having carbon atoms of not less than 7 in a molecule includes metal salts of fatty acid, petroleum acid or polymeric acid, other than alkali metal salts. They may be used alone or in combination of two or more kinds.

Organic acids composing the polyvalent metal salts of organic acids exemplified are long chain or branched fatty acids such as caproic acid, octylic acid, octynoic acid, decanoic acid, lauric acid, myristic acid, palmitic acid, oleic acid, stearic acid, etc.; petroleumacids such as benzoic acid, myristicinic acid, naphthenic acid, naphthoic acid, naphthoxyacetic acid, etc.; polymeric acids such as poly (meth) acrylic acid, polysulfonic acid, and the like and preferable ones have a carboxyl group in a molecule and more preferably includes fatty acids such as caproic acid, octylic acid, octynoic acid, decanoic acid, lauric acid, myristic acid, palmitic acid, oleic acid, stearic acid, tallow acid or hydrogenated fatty acid of castor oil, etc. Further preferably, they are fatty acids without an unsaturated bond in a molecule, for example, caproic acid, octylic acid, decanoic acid, lauric acid, myristic acid, palmitic acid, stearic acid. Most preferably, they are long chain type fatty acids having not less than 12 carbon atoms in a molecule, without an unsaturated bond in a molecule such as laulic acid, myristic acid, palmitic acid and stearic acid.

(C) An Inorganic Fine Particle

A water absorbing agent of the present invention may be formulated with inorganic fine particles, in particular, inorganic fine particles of non-dissolving in water type to improve fluidity after moisture absorption. Specific inorganic powders to be used in the present invention include, for example, metal oxides such as silicon dioxide, titanium oxide, aluminium oxide etc.; silica acid (silicate) such as natural zeolite, synthetic zeolite, etc.; for example, kaolin, talc, clay, bentonite, etc. Among these, silicon dioxide and silica acid (silicate salt) are more preferable and silicon dioxide and silica acid (silicate salt) with average particle diameter, measured by a coulter counter method, of 0.001 to 200 μm are further preferable.

(D) A Composite Hydrated Oxide

A water absorbing agent of the present invention may further be formulated with a composite hydrated oxide containing zinc and silicon or zinc and aluminum (for example, JP-Application-2003-280373) to furnish superior fluidity after moisture absorption (powder fluidity after a water-absorbing resin or a water absorbing agent absorbs moisture) and further superior deodorization performance.

(E) Others

Other additives such as an antimicrobial, an aqueous polymer, water, an organic fine particle, and the like may be added arbitrarily, as long as a water absorbing agent of the present invention can be obtained.

(15) A Particulate Water Absorbing Agent of the Present Invention

A particulate water absorbing agent of the present invention, obtained by production methods 1 to 3, as an example, is a novel water absorbing agent exhibiting novel performance not conventionally available.

That is, a particulate water absorbing agent of the present invention is:

a particulate water absorbing agent having irregularly pulverized shape, which particulate water absorbing agent comprises as a main component a surface crosslinked water-absorbing resin obtained by crosslinking polymerization of an unsaturated monomer having an acid group and/or salts thereof, the particulate water absorbing agent contains agglomerated particles therein, and further the particulate water absorbing agent satisfies (i) to (iii) described below:

(i) centrifuge retention capacity (CRC) of the particulate water absorbing agent in a physiological saline solution being not lower than 32 g/g;

(ii) mass median particle size (D50) of the particulate water absorbing agent being in the range of 200 to 400 μm; and (iii) particles of the particulate water absorbing agent smaller than 600 μm and not smaller than 150 μm being in the range of 95 to 100% by weight.

The water absorbing agent of the present invention is controlled to have (ii) mass median particle size (D50) of usually as narrow range as 200 to 400 μm, preferably 225 to 380 μm, particularly preferably 250 to 350 μm, especially preferably 250 to 330 μm, and (iii) ratio of particles smaller than 600 μm and not smaller than 150 μm to be 95 to 100% by weight, more preferably 96 to 100% by weight and further preferably 97 to 100% by weight. Further preferably, ratio of particles smaller than 500 μm and not smaller than 150 μm is in the range of 90 to 100% by weight and further preferably 92 to 100% by weight, most preferably 93 to 100% by weight. When particles are out of the range, particle size distribution is broadened, particles smaller than 150 μm increase and particles not smaller than 600 μm or 500 μm increase, which provide poor liquid permeability or poor hand touch feeling when used in a thin absorbing substrate and thus not preferable. It may not exhibit effect of the present invention, due to large variation in absorbing ability of an absorbing substrate in producing a thin absorbing substrate.

Particle size is adjusted to specific range by controlling particle size of the water absorbing resin before surface crosslinking, and by agglomeration of absorbing resin after surface crosslinking. Mass median particle size is over 400 μm, not only foreign material feeling will be generated at the surface of a sanitary napkin or a diaper or holes may appear at a top sheet, caused by irregularly pulverized shape and thus not preferable, but also tends to generate troubles such as generation of ruggedness at the surface of a sanitary napkin or a diaper after water absorption, which gives unpleasant feeling to a user or liquid leak along rugged surface, in practical application to a sanitary napkin or a diaper. Further, it delays absorption speed due to small surface area per unit weight of an absorbing agent and gives a user fitting thereof uncomfortable feeling for extended period due to long time required to complete liquid absorption and thus not preferable. Such troubles appear significantly, in particular, in an absorbing substrate with high ratio (high concentration) of a water absorbing agent or a water-absorbing resin contained in a thin absorbing substrate or so to speak a sandwich type water absorbing substrate, wherein a water-absorbing agent is sandwiched between 2 thin pulp (nonwoven cloth) sheets. On the other hand, when mass median particle size is smaller than 200 μm, not only control becomes difficult for amount of particles smaller than 150 μm to be in the range of 0 to 5% by weight but also amount of fine powders (particles smaller than 150 μm) generating in pulverizing process increases, waste amount increases and amount of recovery and recycle increases, which make production difficult in view of cost, along with liquid permeability becomes inferior and liquid take up rate into an absorbing substrate becomes significantly low and thus not preferable.

In the present invention, (i) centrifuge retention capacity (CRC) in a physiological saline solution is controlled to not smaller than 32 g/g, preferably 34 to 70 g/g, more preferably 35 to 70 g/g, further preferably 36 to 70 g/g, further preferably 38 to 70 g/g and particularly preferably 40 to 65 g/g. When it is out of the range, it raises a problem of insufficient absorption capacity if used in a diaper.

(16) Other Characteristics of a Particulate Water Absorbing Agent of the Present Invention (iv) Absorbency Against Pressure Absorbency against pressure at 1.9 kPa pressure (under load) in a physiological saline solution of a water absorbing agent of the present invention is preferably not lower than 20 g/g, more preferably not lower than 25 g/g, further preferably not lower than 30 g/g and particularly preferably not lower than 35 g/g. When that value is less than 20 g/g, effect of the present invention may not be fulfilled. The upper limit is not especially limited, however, about 60 g/g may be sufficient in certain cases in view of cost increase due to difficulty in production.

(v) Percentage of Particles Smaller than 150 μm; (vi) Logarithmic Standard Deviation In a water absorbing agent of the present invention, ratio of particles smaller than 150 μm is controlled in the range of 0 to 5% by weight, preferably 0 to 4% by weight and more preferably 0 to 3% by weight. When ratio of particles smaller than 150 μm is within the range, not only superior handling is obtained due to little dust but also liquid permeability and absorbency against pressure are superior.

(vi) Logarithmic standard deviation ($\sigma\zeta$) of particle size distribution is controlled to preferably 0.20 to 0.40, more preferably 0.20 to 0.38 and particularly preferably 0.20 to 0.36. When logarithmic standard deviation is out of the range, mass median particle size tends to be out of the desired range of 150 to 600 µm, in high probability.

(vii) Vortex Absorption Speed

Absorption speed of a water absorbing agent of the present invention is shorter than 60 seconds, preferably 1 to 55 seconds, more preferably 2 to 50 seconds and most preferably 2 to 30 seconds. A water absorbing agent with absorption speed over 60 seconds may not fulfill sufficient effect due to long time required to completely absorb liquid and long time duration of unpleasant feeling of a user fitting a diaper or a sanitary napkin.

(viii) Fluidity (Blocking Ratio) After Moisture Absorption

A water absorbing agent of the present invention is superior in powder handling characteristics due to having excellent fluidity after moisture absorption described later in Example. Fluidity after moisture absorption is preferably 0 to 20% by weight, further preferably 0 to 10% by weight and particularly preferably 0 to 5% by weight. Fluidity after moisture absorption over 20% by weight provides a problem such as difficulty in production of a diaper owing to poor powder fluidity. These fluidity after moisture absorption can be attained by using the additives.

(ix) Decrease Ratio of Mass Median Particle Size by Impact and Increase Ratio of Mass Median Particle Size by Agglomeration A particulate water absorbing agent of the present invention has decrease ratio of mass median particle size by impact described later in Examples, in the range of 5 to 30%, more preferably 5 to 20%, further preferably 7 to 18% and further more preferably 9 to 16%. When decrease ratio of mass median particle size by impact is higher than 30%, for example in producing a diaper, agglomerated particles are easily destructed, which increases fine powders of a water-absorbing resin, causing bad effect in producing a diaper, or makes uniform dispersion impossible among hydrophilic fibers in preparation of an absorbing substrate or makes retention impossible of desired amount of a particulate water absorbing agent due to fall off from an absorbing substrate. While, when decrease ratio of mass median particle size by impact is lower than 5%, it also provides problems of big volume change of a particulate water absorbing agent after liquid absorption, which causes partial unevenness in thickness of a thin absorbing substrate after liquid absorption, foreign material feeling of a thin absorbing substrate before liquid absorption or rugged surface after liquid absorption. That is, decrease ratio of mass median particle size to be in specific range means breaking of large agglomerated particles by impact, which exerts effect of little generation of foreign material feeling of thin absorbing articles in dry state. Increase ratio of mass median particle size by agglomeration, to be shown later in Examples, is concept opposite to the decreasing ratio of mass median particle size by impact and expresses changing ratio of mass median particle size generating in agglomerating process. Increase ratio of mass median particle size by agglomeration is 5 to 30% by weight, more preferably 5 to 20% by weight, further preferably 7 to 18% by weight and particularly preferably 9 to 16% by weight. By controlling within such range, decrease ratio (%) of mass median particle diameter by impact can be controlled in desired range.

(x) Bulk Density of Gel After Saturated Swelling in a Physiological Saline Solution A particulate water absorbing agent of the present invention has bulk density of gel after saturated swelling in a physiological saline solution shown later in Examples, in the range of 0.80 to 1.0 (g/cm$^3$), preferably 0.85 to 1.0 (g/cm$^3$), more preferably 0.90 to 1.0 (g/cm$^3$) and particularly preferably 0.95 to 1.0 (g/cm$^3$). When bulk density of gel after saturated swelling is smaller than 0.80, it provides big volume change of a particulate water absorbing agent after liquid absorption, which causes partial unevenness in thickness of a thin absorbing substrate after liquid absorption or rugged surface after liquid absorption.

In the case that volume of absorbing articles is far larger than that of liquid absorbed, it may restrict easy movement of a user fitting thin absorbing articles or the fitting state is apparently observed from outside, which significantly increase spiritual burden of a user. On the other hand, in the case of a water absorbing agent of the present invention, volume of absorbed liquid and volume of a water absorbing agent after water absorption is almost the same, therefore it provides easy movement of a user fitting absorbing articles using a water absorbing agent of the present invention or the fitting state is not observed from outside, which can reduce spiritual burden of a user.

(xi) Liquid Permeation Time Under Pressure

Liquid permeation time under pressure is time required for 50 ml of a physiological saline solution to pass through a layer of a swollen water absorbing agent or a water-absorbing resin, under pressure of 0.1 psi, using specific apparatus to be described later. Shorter time required for passing through indicates easier liquid permeability through a layer of a swelled water absorbing agent or a water-absorbing resin, and thus superior liquid permeation property.

Liquid permeability in the present invention is a term including diffusivity and effect of superior liquid permeability of the water absorbing agent appears, for example, as not only superior liquid take-up to absorbing article in thin absorbing articles but also high liquid spreading ability from body fluid discharging portion to whole area of absorbing article. This results in effective utilization of whole area of absorbing article and reduction of liquid leakage or Re-wet amount. In particular, this effect is significantly appears in an absorbing substrate with high ratio (high concentration) of a water absorbing agent or a water-absorbing resin in a thin absorbing substrate, or so to speak a sandwich absorbing substrate prepared by sandwiching a water-absorbing agent layer with 2 thin pulp (nonwoven cloth) sheets.

Many reports have been submitted on challenges to improve such liquid permeability including, for example, "saline flow conductivity" described in WO05/22356; "Liquid permeation time of a physiological saline solution" described in JP-A-6-57010; and further WO96/17884.

Liquid permeability largely depends on absorption capacity, and the higher absorption capacity provides the lower liquid permeability. It is important to improve liquid permeability while keeping high absorption capacity and the present invention has surprising effect to improve liquid permeability without decreasing absorption capacity so much by a very simple method for carrying out agglomeration process.

Liquid permeation time under pressure required for a particulate water-absorbing agent of the present invention is difficult to be specified, due to dependence on concentration of an absorbing substrate, wherein a water absorbing agent is used, however, is preferably over 0 and not longer than 200 seconds, more preferably over 0 and not longer than 100 seconds and most preferably over 0 and not longer than 60 seconds.

Effect of the present invention can be expressed by shortening ratio of liquid permeation time under pressure, to be described later, and by carrying out agglomeration process, the ratio of liquid permeation time can be not lower than 10% compared with the case without agglomeration process, preferably not lower than 20%, further preferably not lower than 25% and upper limit thereof is 100%.

Reasons for superior liquid permeability of a water absorbing agent containing agglomerated particles obtained by agglomeration using, for example, water, as in the present invention, are not clear, however, the following 2 points are considered: 1) By agglomeration process, fine powders which is clogging among water absorbing agent particles are decreased, which improves liquid fluidity and 2) various inorganic fine powders or polyvalent metal salts, composite hydrated oxides, and the like added to improve liquid permeability tend to be more firmly hold at the surface of a water-absorbing agent particle, which improves liquid fluidity.

(xii) Water Content

Water content is a parameter to specify volatile matter such as water contained in a water absorbing agent. A water absorbing agent of the present invention has water content preferably in the range of 1 to 10% by weight and more preferably in the range of 2 to 10% by weight. When water content is outside the range, improvement effect of the present invention is not obtained such that not only improvement effect of the liquid permeability does not obtained but also volume resistivity of a water absorbing agent, to be described later, also increases.

(xiii) Volume Resistivity of the Water Absorbing Agent

Volume resistivity of the water absorbing agent is electric resistivity in a layer of a water absorbing agent, measured under measurement conditions to be described later. Charging degree of static electricity is judged generally by the following evaluation criteria:

one having volume resistivity in the range not lower than $10^{14}$ [Ω·m] is defined as ultra charging substrate.

one having volume resistivity in the range of $10^{12}$ to $10^{14}$ [Ω·m] is defined as high charging substrate.

one having volume resistivity in the range of $10^{10}$ to $10^{12}$ [Ω·m] is defined as charging substrate.

one having volume resistivity in the range of $10^{8}$ to $10^{10}$ [Ω·m] is defined as low charging substrate.

one having volume resistivity in the range not higher than $10^{8}$ [Ω·m] is defined as non charging substrate.

A water absorbing agent of the present invention has volume resistivity of $10^{8}$ [Ω·m], as will be shown in Examples later, and is classified to low charging substrate. On the other hand, a water-absorbing resin without containing agglomerated particles and having water content of less than 1% has volume resistivity of $10^{11}$ [Ω·m] and is classified to charging substrate. Thus, a water absorbing agent of the present invention shows such effect as little electrostatic charging during manufacturing process of thin absorbing article, little powder scattering and adherence caused by static electricity and thus superior handling. Volume resistivity range of a water absorbing agent of the present invention is preferably not higher than $10^{10}$ [Ω·m] and further preferably not higher than $10^{9}$ [Ω·m].

(17) An Absorbing Article

Applications of a particulate water absorbing agent of the present invention are not especially limited, however, it is used preferably in thin absorbing substrate and an absorbing article such as a thin absorbing article.

For example, a thin absorbing substrate is obtained using the particulate water absorbing agent. The absorbing substrate of the present invention means one formed using a particulate water absorbing agent and hydrophilic fibers as main components. Content of the water absorbing agent (core concentration) in the absorbing substrate of the present invention, based on total weight of a water absorbing agent and hydrophilic fibers is preferably 30 to 100% by weight, further preferably 35 to 100% by weight and particularly preferably 40 to 100% by weight.

In the case that an absorbing substrate of the present invention is a thin type, thickness of an absorbing substrate is preferably 0.1 to 5 mm. By using such a thin type absorbing substrate, a thin absorbing article can be obtained. Further, an absorbing article of the present invention is one equipped with the thin absorbing substrate of the present invention, a surface sheet with liquid permeability and a back sheet with liquid non-permeability.

A method for production of the absorbing article of the present invention may be, for example, as follows: Preparation of the absorbing substrate (absorbing core) by blending or sandwiching a fiber substrate and a particulate water absorbing agent, followed by sandwiching the absorbing core between the substrate with liquid permeability (the surface sheet) and the substrate with liquid non-permeability (the back sheet) and if necessary, mounting of elastic parts, diffusion layers, adhesive tapes, and the like, to fabricate the absorbing article, in particular, a diaper for an adult or a sanitary napkin. Such an absorbing article is molded under compression to have density in the range of 0.06 to 0.50 g/cc and basis weight in the range of 0.01 to 0.20 g/cm². The fiber substrate to be used is exemplified to be hydrophilic fiber, crushed wood pulp, or cotton linter, crosslinked cellulosic fiber, rayon fiber, cotton fiber, wool fiber, acetate fiber, vinylon fiber, etc. Preferably they are used as airlied.

A particulate water absorbing agent of the present invention is one exhibiting superior absorption characteristics. Therefore, absorbing articles of the present invention specifically includes, sanitary articles starting from a paper diaper for an adult, whose growth is significant recently, a diaper for a child, a sanitary napkin, so to speak a pad for incontinence, and the like. By existing the particulate water absorbing agent present in an absorbing article, it attains less leakage and manifests excellent use feeling and dry feeling, therefore loads of person wearing such an absorbing article and of nursing staffs can be reduced significantly.

EXAMPLES

The present invention will be elucidated specifically with the following Examples and Comparative Examples, but, the present invention is not limited to the following examples.

Various performances of a water absorbing agent were measured by the following methods. They were evaluated also by using a water-absorbing resin instead of a water absorbing agent. Electrical equipment was always used under conditions of 100 V and 60 Hz in Examples. A water-absorbing resin, a water absorbing agent and absorbing articles were used under conditions of 25° C.±2° C. and 50% RH (relative humidity), unless particularly specified. An aqueous solution of 0.90% by weight of sodium chloride was used as a physiological saline solution.

A water-absorbing resin and a diaper on the market and a water-absorbing resin taken out of a diaper which may absorb moisture on distribution, may be used in a comparison test after drying under reduced pressure (for example, for about 16 hours at 60 to 80° C.), as appropriate, to equilibrium moisture content (2 to 8% by weight, about 5% by weight) of the water-absorbing resin.

(a) Centrifuge Retention Capacity (CRC) for a Physiological Saline Solution

A water absorbing agent of 0.20 g was uniformly put in a bag (60 mm×85 mm) made of nonwoven fabric and immersed in a physiological saline solution controlled at 25±2° C. The bag containing the water absorbing agent was taken out of the saline solution after 30 minutes and subjected to dewatering for 3 minutes at 250 G (250×9.81 m/sec$^2$) using a centrifuge (Model H-122 small size centrifuge made by Kokusan Corporation) and then weighed to get weight W2 (g). Weight W1 (g) of the bag was measured after similar operation without any water absorbing agent. Centrifuge Retention Capacity (g/g) was calculated from weights W1 and W2 according to the following formula.

Centrifuge Retention Capacity (g/g) =((weight W2 (g)−weight W1 (g))/weight of water absorbing agent (g))−1

(b) Absorbency Against Pressure at 1.9 kPa (AAP1.9 kPa) for a Physiological Saline Solution This measurement was practiced according to a method 442.1-99 (Absorbency against pressure) provided by EDANA (European disposable and nonwovens association).

A water absorbing agent of 0.900 g was uniformly scattered on a 400-mesh wire mesh made of stainless steel (mesh size: 38 μm) welded to the bottom end face of a plastic support cylinder with inner diameter of 60 mm. A piston (coverplate), which has outer diameter a little smaller than 60 mm, no gap against the inner surface of the support cylinder and can move up and down smoothly, was mounted on the water absorbing agent. Total weight W3 (g) of the support cylinder, the water absorbing agent and the piston was measured. A load was mounted on the piston to complete a set of measuring apparatus, wherein the load was adjusted so that the total weight of the load and the piston uniformly presses the water absorbing agent at 1.9 kPa (about 20 g/cm$^2$, about 0.3 psi). A glass filter with diameter of 90 mm and thickness of 5 mm was placed in a Petri dish with diameter of 150 mm and a physiological saline solution controlled at 25±2° C. was poured up to the same level as the upper surface of the glass filter. A sheet of filter paper with diameter of 9 cm (No. 2 from Toyo Roshi Kaisha Ltd.) was placed on the surface of glass filter so as to be entirely wetted and then excess liquid was removed.

The set of the measuring apparatus was placed on the wetted filter paper and the liquid was absorbed with the water absorbing agent under load. The liquid level was kept constant by adding the liquid when the liquid surface became lower than the upper surface of the filter paper. The set of the measuring apparatus was lifted up after an hour and weight W4 (g) (the total weight of the support cylinder, the swollen water absorbing agent and the piston) excluding the Load was measured again. Absorbency against pressure (g/g) was calculated from weights W3 and W4 according to the following formula.

Absorbency Against Pressure (g/g)=(weight W4 (g)−weight W3 (g))/weight of a water absorbing agent (g)

(c) Mass median particle size (mass average particle diameter) (D50), logarithmic standard deviation (σζ) and percentage by weight of particles smaller than 600 μm and not smaller than 150 μm in diameter.

A water absorbing agent was subjected to sieve classification using JIS standard sieves of 850 μm, 710 μm, 600 μm, 5.00 μm, 425 μm, 300 μm, 212 μm, 150 μm, 106 μm and 45 μm, and percentage by weight of particles smaller than 600 μm and not smaller than 150 μm in diameter was measured, while oversize percentages R at each particle size were plotted on a logarithmic probably paper. Particle diameter corresponding to R=50% by weight was thus determined as mass median particle size (D50). Logarithmic standard deviation (σζ) is represented by the following formula, wherein smaller value of σζ means narrower particle-size distribution.

σζ=0.5×ln(X2/X1)

(wherein X1 and X2 are particle diameters for R =84.1% by weight and R=15.9% by weight, respectively)

For sieve classification, a water absorbing agent of 10.00 g is charged into each of the JIS standard mesh sieves (The IIDA TESTING SIEVE: inner diameter of 75 mm) and sieved for 5 minutes using a Ro-tap type sieve shaker (Model ES-65 sieve shaker from Iida Seisakusho Co., Ltd.).

Mass median particle size (D50) means particle diameter for a standard sieve, corresponding to 50% by weight based on the whole particles, when sieving is carried out by standard sieves with particular meshes as described in U.S. Pat. No. 5,051,259 etc.

(d) Evaluation of Absorption Speed (Vortex Method)

A 0.90% by weight aqueous solution of sodium chloride (physiological saline solution) prepared in advance of 1,000 parts by weight was mixed with 0.02 part by weight of a brilliant blue-FCF, a food additive, and kept at 30° C. The physiological saline solution of 50 ml was poured into a 100 ml beaker and added with 2.0 g of a water absorbing agent while stirring at 600 rpm with a cylinder-type stirrer with length of 40 mm and diameter of 8 mm, to measure absorption speed (sec.). Absorption speed (sec.) is time required for the test liquid to completely cover the stirrer chip as the water absorbing agent absorbs the physiological saline solution, which was measured according to the standard described in JIS K 7224 (1996) "Testing method for water absorption speed of super absorbent resins—Description"

(e) Fluidity (Blocking Ratio) After Moisture Absorption (% by Weight)

A water absorbing agent of 2 g was uniformly scattered on the bottom of an aluminum cup with diameter of 52 mm and height of 22 mm and quickly put in a humidity-controllable incubator (PLATIOOUS LUCIFER PL-2G from ESPEC Corp.) controlled beforehand at 25° C. and 90% relative humidity, and left for standing for 60 minutes. Then the moisture-absorbed water absorbing agent was translated into JIS standard sieves of 2000 μm in diameter 7.5 cm. When the moisture-absorbed water absorbing agent adheres to the aluminum cup too rigidly to be transferred to the JIS standard sieve, the moisture-absorbed and lumped water absorbing agent should be torn off the cup and transferred to the sieve very carefully not to destroy the lumping. The transferred water absorbing agent to the sieve was immediately sieved for 8 seconds using a Ro-tap type sieve shaker (IIDA SIEVE SHAKER, TYPE: ES-65, SER.No.0501). Weight W5 (g) of the oversize water absorbing agent left on the sieve and weight W6 (g) of the undersize water absorbing agent passed through the sieve were measured. Fluidity after moisture absorption (% by weight) was calculated by the following formula. The lower value in fluidity after moisture absorption means, the better water absorbing agent in fluidity after moisture absorption and in powder handling nature.

Fluidity after moisture absorption (% by weight)= (weight W5 (g)/(weight W5 (g)+weight W6 (g)))×100

(f) Decrease ratio of mass median particle size by impact and increase ratio of mass median particle size by agglomeration A water absorbing agent of 30.0 g and 10.0 g of glass beads having diameter of 6 mm were charged into a container with inner volume of 125 g (Mayonnaise bottle with Trade name of A-29 from Yamamura Glass Co., Ltd.: See container 41 in FIG. 12 of U.S. Pat. No. 6,071,976), followed by sealing, mounting on a dispersing machine (No. 488 test dispersing machine from Toyo Seiki Seisaku-Syo, Ltd.: See FIG. 14 in U.S. Pat. No. 6,071,976) and vibration for 10 minutes using the dispersing machine under conditions of 100 V/60 Hz, vibration rotation speed of 750 c.p.m. After the impact, mass median particle size (D50) was measured by the previous method. Mass median particle size (D50) of a water absorbing agent before impact was also measured in advance. Decrease ratio of mass median particle size by impact and increase ratio of mass median particle size by agglomeration were calculated by the following formulas.

Decrease ratio of mass median particle size by impact (%)=100×((D50 before impact)−(D50 after impact))/D50 before impact Increase ratio of mass median particle size by agglomeration (%)=100×((D50 after agglomeration)−(D50 before agglomeration))/D50 after agglomeration.

(g) Bulk density of gel after saturated swelling in a physiological saline solution (g/cm$^3$)

A water absorbing agent of 3.0 g was uniformly scattered on a 400-mesh wire mesh made of stainless steel (mesh size: 38 µm) welded to the bottom end face of a plastic support cylinder with inner diameter of 60 mm and height of 200 mm. A glass filter with diameter of 90 mm and thickness of 5 mm was placed in a container (2 L glass beaker, TOP, Cat. No. 501 from Sogo Rikagaku Glass Seisakusyo Co., Ltd.) filled with 1.5 L of a physiological saline solution, in which the plastic cylinder with the water absorbing agent was immersed and stood still on the glass filter. After 30 minutes of standing still, the support cylinder containing the swollen water absorbing agent was taken out from the container filled with a physiological saline solution, followed by hanging for 1 minute to roughly remove excess solution and placing 400 mesh stainless screen surface of the support cylinder on five sheets of wiper towels folded in four (sheet size=38.0×33.0 cm, product No. 61000 from Cresia Co., Ltd.) for 3 minutes to remove excess solution (that is, to remove a physiological saline solution not absorbed by the water absorbing agent). Then a piston (11 g), which has outer diameter a little smaller than 60 mm, no gap against the inner surface of the support cylinder and can move up and down smoothly was mounted on the swollen water absorbing agent layer and left for 3 minutes. Height (thickness) of the swollen gel bed was measured by distance between the bottom surface of the support cylinder and the bottom surface of the piston. Gel volume (V1 cm$^3$) was calculated from height of the swollen gel bed and bottom area of the support cylinder. Total weight W7 (g) of the support cylinder, gel and the piston was measured.

Separately, total weight W8 (g) of the support cylinder and the piston, without including gel was measured. Bulk density of gel after saturated swelling was calculated by the following formula.

Bulk density of gel after saturated swelling in a physiological saline solution (g/cm$^3$)=(W7 (g)−W8 (g))/volume of gel (v1) (g/cm$^3$)

When bulk density of gel after saturated swelling is near 1.0 (g/cm$^3$), volume change of a particulate water absorbing agent after liquid absorption becomes small, which eliminate a problem of partial unevenness in thickness or rugged surface of a thin absorbing substrate after liquid absorption.

(h) Evaluation of Absorbing Substrate Performance

An absorbing substrate for evaluation was prepared to evaluate a water absorbing agent to be described later as an absorbing substrate and subjected to a Re-wet test.

To begin with, a method for preparation of an absorbing substrate for evaluation is shown below.

A water absorbing agent to be described later of 1 part by weight and crushed wood pulp of 2 parts by weight were subjected to dry mixing using a mixer. Thus obtained mixture was spread on a wire screen of 400 mesh (mesh size: 38 µm) to form a web with diameter of 90 mm. The web was pressed under pressure of 196.14 kPa (2 kgf/cm$^2$) for 1 minute to obtain an absorbing substrate for evaluation with basis weight of 0.05 g/cm$^2$.

Subsequently, a method for evaluation of Re-wet amount after 10 minutes is shown below.

The absorbing substrate for evaluation was placed on the bottom of a Petri dish with inner diameter of 90 mm made of stainless steel and nonwoven fabric with diameter of 90 mm was placed thereon. A physiological saline solution (a 0.9% by weight of NaCl aqueous solution) of 30 ml was then poured over the nonwoven fabric and subjected to absorption for 10 minutes under conditions of no load. Subsequently, 30 sheets of filter paper with diameter 90 mm (No. 2 from Toyo Roshi Kaisha Ltd.), whose weight (W9[g]) was measured beforehand, was placed on the nonwoven and the absorbing substrate. And then, a piston and a load (total weight of the piston and load was 20 kg) with diameter 90 mm were placed on the filter paper so as to press uniformly the absorbing substrate, the nonwoven and the filter paper. The filter papers were made to absorb Re-wet liquid, while pressing for 5 minutes. The 30 sheets of the filter papers were then weighed (W10 (g)) to calculate Re-wet amount after 10 minutes.

Re-wet amount for 10 minutes (g)=W10 (g)−W9 (g)

(i) Evaluation of Absorbing Substrate Thickness

Thickness of an absorbing substrate was measured under load of 0.5 kPa on an absorbing substrate.

(j) Liquid Permeation Time Under Pressure

First, measurement apparatus for liquid permeation time under pressure is explained by referring to FIG. 1.

As shown in FIG. 1, the measurement apparatus is composed of a glass column 20, a pressurization rod 21 and a Load 22. The glass column 20 has cylinder-like form with inner diameter of 25.4 mm and height of 400 mm. Under the glass column 20, a universal open-close stopcock 25 is attached and between the open-close stopcock 25 and the glass column 20, a glass filter 27 is inserted. The glass filter 27 has mesh size of G1. On the glass column 20, standard lines L and H are marked. The standard line L corresponds to position of liquid top surface when the column is filled with 100 ml of a physiological saline solution in closed state of the stopcock 25, while the standard line H corresponds to position of liquid top surface when the column is filled with 150 ml of a physiological saline solution in closed state of the stopcock 25. As the glass column 20, a commercial product "Biocolumn CF-30K" (from Asone Co., Ltd.: Grade No. 2-635-07) was used.

At the upper end of the pressurization rod 21, a mounting plate 23 for mounting the Load 22 is fixed. The mounting plate 23 is fabricated in circle-like having diameter a little smaller than inner diameter of the glass column 20.

At the lower end of the pressurization rod 21, a pressurization plate 24 is fixed. The pressurization plate 24 is fabricated in circle-like having diameter a little smaller than 25.4 mm and thickness of 10 mm and 64 holes of 24a are formed so as to penetrate from the upper surface to lower surface. The plurality of the holes of 24a have diameter of 1 mm and are aligned in about 2 mm interval. Therefore, a physiological saline solution 29 can flow from the upper surface side to the lower surface side of the pressurization plate 24 through the plurality of holes of 24a.

The pressurization rod 21, that is, the pressurization plate 24 can move up and down directions in the glass column 20. At the lower surface of the pressurization plate 24 is attached a glass filter 26 with diameter of a little smaller than 25.4 mm and thickness of 3 mm. The glass filter 26 has mesh size G0. Length of the pressurization rod is 330 mm.

Total weight of the load 22 and the pressurization rod is adjusted so as to uniformly add load of 7.03 g/cm$^2$ (0.689 kPa, 0.1 psi) to a swollen water absorbing agent 30.

Using the measurement apparatus composed as above, liquid permeation time under pressure was measured. The measurement method is explained below.

First of all, to a 200 ml beaker, 100 ml of a physiological saline solution (a 0.9% by weight NaCl aqueous solution) was charged, followed by the addition of 0.2000 g of a water absorbing agent to swell for 20 minutes.

Separately, during this time, into the glass column 20 mounted with the glass filter 27 and with the stopcock 25 in closed state, 200 ml a physiological saline solution (a 0.9% by weight NaCl aqueous solution) was charged, followed by opening the stopcock to flow down 150 ml of the physiological saline solution to purge air in the glass filter 27 and the stopcock out of the system.

After swelling of the water absorbing agent or a water-absorbing resin in the beaker for 20 minutes, the physiological saline solution and the swollen water absorbing agent or water-absorbing resin in the beaker were moved to the column. Then, further 30 ml of another physiological saline solution is added to the beaker to completely transfer contents in the beaker to the column, followed by transferring the liquid to the column.

To completely settle the swollen water absorbing agent or water-absorbing resin, at the bottom of the column, they are stood still for 5 minutes.

After 5 minutes, the pressurization rod is slowly inserted in the column. Careful insertion is required not to remain air in the hole 24a set in the pressurization rod. After contacting the pressurization rod with a layer of the water absorbing agent or a water-absorbing resin, the Load 22 is slowly loaded, followed by standing still for further 5 minutes to stabilize the layer of the water absorbing agent or water-absorbing resin.

After 5 minutes, the stopcock 25 is opened to pass the liquid. Passing time of the upper surface of the liquid from standard line H to standard line L is measured.

Immediately after the upper surface of the liquid passes the standard line L, the stopcock 25 is closed and a physiological saline solution is added slowly from the upper part of the column so that the liquid surface is raised up to about 5 cm above the standard line H (during this period, the pressurization rod and the Load shall not be removed). After the addition of the liquid, the stopcock 25 is opened again to similarly measure passing time of the upper surface of the liquid from standard line H to standard line L. Similar liquid passing operations are repeated 4 times. Liquid permeation time under pressure is average value of liquid permeation times at No. 2, 3 and 4 trials. Liquid permeation time in the case of similar operation without the gel layer is 8 seconds.

The shorter liquid permeation time means the higher liquid permeability of a water absorbing agent and when applied to a thin absorbing substrate, it means improvement in liquid intake ability under pressure. Shortening ratio of liquid permeation time under pressure was calculated by the following formula.

Shortening ratio of liquid permeation time under pressure (%)=100×[(liquid permeation time under pressure without agglomeration)−(liquid permeation time under pressure with agglomeration)]/ (liquid permeation time under pressure without agglomeration)

(k) Water Content

On an aluminum dish with diameter of 60 mm and known weight (W11 (g)), 2.000 g of a water absorbing agent is spread uniformly and stand still for 3 hours in a oven without air circulation (EYELA natural oven NDO-450 from Tokyo Rika Machinery Co., Ltd.). After 3 hours, the aluminum dish is taken out and cooled in a desiccator for 20 minutes to measure weight (W12 (g)). Water content was calculated by the following formula.

Water content (% by weight)=[(W11 (g)+2.000 (g))− W12 (g)]/2.000   (Formula 9)

(1) Volume Resistivity of a Water Absorbing Agent

Volume resistivity of a water absorbing agent was measured using digital ultra-high resistance/micro ammeter (R8340A model from Advantec Co., Ltd.). A water absorbing agent to be evaluated is stored for not shorter than 24 hours under conditions of sealed and measuring environment (19 to 21° C. and relative humidity of 36 to 44% RH), and opened the seal to be used just before the test. First of all, a sample container for powder resistant measurement (A-1-2, diameter of 150 mm and length of 10 mm) is filled with a water absorbing agent, which container is then set on the measurement apparatus (sample thickness of 10 mm). Diameter of an electrode and electrode coefficient of the apparatus used for the measurement is 80 mm and 0.503, respectively. After completion of setting, voltage of 100 V is impressed and volume resistivity is measured after 1 minute (1 minute value). The measurement is repeated 3 times by replacing samples and 3 results are averaged to obtain the measurement value. Degree of electric charging nature is judged generally by the following evaluation criteria:

one having volume resistivity in the range not lower than $10^{14}$ [Ω·m] is defined as ultra charging substrate.

one having volume resistivity in the range of $10^{12}$ to $10^{14}$ [Ω·m] is defined as high charging substrate.

one having volume resistivity in the range of $10^{10}$ to $10^{12}$ [Ω·m] is defined as charging substrate.

one having volume resistivity in the range of $10^{8}$ to $10^{10}$ [Ω·m] is defined as low charging substrate.

one having volume resistivity in the range not higher than $10^{8}$ [Ω·m] is defined as non charging substrate.

Reference Example 1

Polyethylene glycol diacrylate (average added mole number of ethylene oxide unit: 9) of 2.5 g was dissolved in 5,500 g of an aqueous solution of sodium acrylate having neutralization ratio of 75% by mole (monomer concentration: 38% by weight) to make reaction liquid. Subsequently, the reaction liquid was supplied to a reactor fabricated by attaching a lid to a 10-L twin-arm type kneader made of stainless steel and equipped with a jacket and two Σ-shaped agitating blades and then nitrogen gas was introduced in the reaction system to purge out dissolved oxygen, while keeping the reaction liquid at 30° C. The reaction liquid was then added with 29.8 g of a 10% by weight aqueous solution of sodium persulfate and 1.5 g of a 1% by weight aqueous solution of L-ascorbic acid while stirring the reaction liquid, resulting in initiation of polymerization after 1 minute. Peak temperature of polymerization of 86° C. was attained after 17 minutes from initiation of polymerization. After 60 minutes from initiation of polymerization, a hydrated gel-like polymer was taken out, which polymer was in granulated state to particles with diameter of about 1 to 4 mm. The granulated, hydrated gel-like polymer was spread on a wire net of 50 mesh (mesh opening: 300 μm) and dried with hot air at 160° C. for 60 minutes. Thus dried material was then pulverized by a roll mill and continuously sieved with wire meshes with mesh opening of 500 μm and 106 μm. Particles not smaller than 500 μm were pulverized again using a roll mill. Particles passing a 106 μm mesh metal screen were 12% by weight based on total particles subjected to pulverization. The fine water-absorbing resin particle passed the 106 μm mesh metal screen was mixed with hot water (90° C.) in the same quantity, dried again under the same conditions and pulverized to obtain a particulate water-absorbing resin (a) having irregularly pulverized shape in 97% yield.

Centrifuge retention capacity (CRC) in a physiological saline solution, mass median particle size (D50), percentage of particles of the absorbing agent smaller than 600 μm and not smaller than 150 μm and logarithmic standard deviation of the obtained particulate water-absorbing resin (a) were measured and shown in Table 1. Results of particulate water-absorbing resins (b)-(d) in reference Example below mentioned are shown in Table 1 also.

Thus obtained powder of a water-absorbing resin (a) of 100 parts by weight was mixed with 3.53 parts by weight of a surface crosslinking agent aqueous solution composed of 0.5 part by weight of propylene glycol, 0.03 part by weight of ethylene glycol diglycidyl ether, 0.3 part by weight of 1,4-butanediol and 2.7 parts by weight of water. The mixture was heated at 195° C. for 45 minute in a mortar mixer to obtain a surface crosslinked water-absorbing resin (1). Particle size distribution of the water-absorbing resin (1) is shown in Table 3, mass median particle size and logarithmic standard deviation thereof in Table 4 and volume resistivity thereof in Table 5. Agglomerated particles were little observed in the water-absorbing resin (1).

Reference Example 2

Polyethylene glycol diacrylate (average added mole number of ethylene oxide unit: 9) of 8.6 g was dissolved in 5,500 g of an aqueous solution of sodium acrylate having neutralization ratio of 75% by mole (monomer concentration: 38% by weight) to make reaction liquid. The reaction liquid was supplied to the reactor of Reference Example 1 and nitrogen gas was introduced in the reaction system to purge out dissolved oxygen while keeping the reaction liquid at 30° C. The reaction liquid was then added with 29.8 g of a 10% by weight aqueous solution of sodium persulfate and 1.5 g of a 1% by weight aqueous solution of L-ascorbic acid while stirring the reaction liquid, resulting in initiation of polymerization after 1 minute. Peak temperature of polymerization of 86° C. was attained after 17 minutes from initiation of polymerization. After 60 minutes from initiation of polymerization, a hydrated gel-like polymer was taken out, which polymer was in granulated state to particles with diameter of about 1 to 4 mm. The granulated, hydrated gel-like polymer was spread on a wire net of 50 mesh (mesh opening: 300 μm) and dried with hot air at 160° C. for 60 minutes. Thus dried material was then pulverized by a roll mill and continuously sieved with wire meshes with mesh opening of 850 μm and 150 μm. Particles not smaller than 850 μm were pulverized by the roll mill again. Irregularly pulverized powder of a water-absorbing resin (b) was obtained in 91% yield.

Thus obtained powder of a water-absorbing resin (b) of 100 parts by weight was mixed with 3.53 parts by weight of a surface crosslinking agent aqueous solution composed of 0.5 part by weight of propylene glycol, 0.03 part by weight of ethylene glycol diglycidyl ether, 0.3 part by weight of 1,4-butanediol and 2.7 parts by weight of water. The mixture was heated at 210° C. for 35 minutes in a mortar mixer to obtain a surface crosslinked water-absorbing resin (2). Particle size distribution of the water-absorbing resin (2) is shown in Table 3 and mass median particle size and logarithmic standard deviation thereof in Table 4. agglomerated particles were little observed in the water-absorbing resin (2).

Reference Example 3

Polyethylene glycol diacrylate (average added mole number of ethylene oxide unit: 9) of 4.3 g was dissolved in 5,500 g of an aqueous solution of sodium acrylate having neutralization ratio of 75% by mole (monomer concentration: 38% by weight) to make reaction liquid. The reaction liquid was supplied to the reactor of Reference Example 1 and nitrogen gas was introduced in the reaction system to purge out dissolved oxygen while keeping the reaction liquid at 30° C. The reaction liquid was then added with 29.8 g of a 10% by weight aqueous solution of sodium persulfate and 1.5 g of a 1% by weight aqueous solution of L-ascorbic acid, while stirring the reaction liquid, resulting in initiation of polymerization after 1 minute. Peak temperature of polymerization of 86° C. was attained after 17 minutes from initiation of polymerization. After 60 minutes from initiation of polymerization, a hydrated gel-like polymer was taken out, which polymer was in granulated -state to particles with diameter of about 1 to 4 mm. The granulated, hydrated gel-like polymer was spread on a wire net of 50 mesh (mesh opening: 300 μm) and dried with hot air at 160° C. for 60 minutes. Thus dried material was then pulverized by a roll mill and continuously sieved with wire meshes with mesh opening of 425 μm and 106 μm. Particles not smaller than 425 μm were pulverized again using a roll mill. Particles passed through the 106 μm mesh sieve occupied 15% by weight relative to total weight of pulverized particles. The fine particles of the water-absorbing resin passed through the 106 μm mesh sieve was mixed water with hot water (90° C.) in equal weight ratio, followed by drying again at 160° C. for 60 minutes, pulverizing and classification to obtain irregularly pulverized particles of a water-absorbing resin (c) in 95% yield.

Then, thus obtained particles of a water-absorbing resin (c) of 100 parts by weight was mixed with 3.53 parts by weight of a surface crosslinking agent aqueous solution composed of 0.5 part by weight of propylene glycol, 0.03 part by weight of ethylene glycol diglycidyl ether, 0.3 part by weight of 1,4-butanediol and 2.7 parts by weight of water. The mixture was heated at 210° C. for 35 minutes in a mortar mixer to obtain a surface crosslinked water-absorbing resin (3). Particle size distribution of the water-absorbing resin (3) is shown in Table 3 and mass median particle size and logarithmic standard deviation thereof in Table 4. Agglomerated particles were little observed in the water-absorbing resin (3).

Example 1

To 100 parts by weight of the surface crosslinked water-absorbing resin (1) obtained in Reference Example 1, 4 parts by weight of water was mixed by spraying. The resultant mixture was cured at 60° C. for 1 hour, while water content thereof was maintained at 4% by weight and passed the 600 μm mesh metal screen to obtain a particulate water absorbing agent (1) containing 43% by weight of agglomerated particles. Evaluation results on the particulate water absorbing agent (1) are shown for centrifuge retention capacity, absorbency against pressure at 1.9 kPa, absorption speed, fluidity after moisture absorption, reduction ratio of mass median particle size by impact, bulk density of gel after saturated swelling in a physiological saline solution and water content in Table 2, for particle size distribution in Table 3, for mass median particle size and logarithmic standard deviation in Table 4, and for volume resistivity in Table 5.

Example 2

To 100 parts by weight of the water-absorbing resin (1) obtained in Reference Example 1, 5 parts by weight of a 0.2% sodium diethylenetriamine pentaacetate aqueous solution was mixed by spraying wherein the addition amount of sodium diethylenetriamine pentaacetate becames 100 ppm relative to the water-absorbing resin. The resultant mixture was cured at 60° C. for 1 hour, while water content thereof was maintained at 5% by weight and passed the 600 μm mesh metal screen to obtain a particulate water absorbing agent (2) containing 54% by weight of agglomerated particles. The particulate water absorbing agent (2) was evaluated similarly as in Example 1. Results are shown in Tables 2 to 4.

Example 3

To 100 parts by weight of the surface crosslinked particulate water absorbing agent (1) obtained in Example 1, 0.3 part by weight of fine particulate calcium stearate (from Kanto Chemical Co., Inc.) was added and mixed (dry blended) to obtain a particulate water absorbing agent (3). From measurement of particle size distribution of thus obtained particulate water absorbing agent (3), little change was found. Mass median particle size (D50), logarithmic standard deviation (σζ) and percent by weight of particle diameter of 600 to 150 μm showed the same values as of the particulate water absorbing agent (1) before mixing. Other properties of the particulate water absorbing agent (3) were evaluated similarly as in Example 1. Results are shown in Tables 2 to 5.

Example 4

To 100 parts by weight of the surface crosslinked water-absorbing resin (3) obtained in Reference Example 3, 4.5 parts by weight of water was mixed by spraying. The resultant mixture was cured at 60° C. for 1 hour, while water content thereof was maintained at 4.5% by weight and passed the 600 μm mesh metal screen. To 100 parts by weight of thus obtained particulate water absorbing agent, 0.3 part by weight of fine particulate silicon dioxide (Trade Name: Aerosil 200) was added and mixed (dry blended) to obtain a particulate water absorbing agent (4), containing 48% by weight of agglomerated particles. Centrifuge retention capacity, absorbency against pressure at 1.9 kPa, absorption speed, particle size distribution, fluidity after moisture absorption, reduction ratio of mass median particle size by impact, bulk density of gel after saturated swelling in a physiological saline solution, water content, particle size distribution, mass median particle size and logarithmic standard deviation of the particulate water absorbing agent (4) are shown in Tables 2 to 5.

Comparative Example 1

To 100 parts by weight of the surface crosslinked water-absorbing resin (2) obtained in Reference Example 2, 0.3 part by weight of fine particulate silicon dioxide (Trade Name: Aerosil 200) was added and mixed (dry blended) to obtain a comparative particulate water absorbing agent (1), which was evaluated similarly as in Example 1. Results are shown in Tables 2 to 4.

Example 5

To evaluate performance of the particulate water absorbing agent (1) obtained in Example 1 as an absorbing substrate, an absorbing substrate for evaluation (1) was prepared according to the method (h) mentioned above for evaluation of absorbing substrate performance. Thickness of the absorbing substrate for evaluation was 4 mm. Re-wet amount for 10 minutes of thus obtained absorbing substrate for evaluation (1) was measured and state of the absorbing substrate after absorbing liquid was also observed. Results are shown in Table 6.

Examples 6 to 8

By using the particulate water absorbing agents (2) to (4) obtained in Examples 2 to 4, instead of the particulate water absorbing agent (1) used in Example 5, absorbing substrates for evaluation (2) to (4) were obtained, respectively. Each has thickness of 4 mm. Re-wet amounts of thus obtained absorbing substrates for evaluation (2) to (4) were evaluated and conditions of the absorbing substrates after absorbing liquid thereof were observed. Results are shown in Table 6.

Comparative Example 2

By using the particulate water absorbing agent for comparison (1) obtained in Comparative Example 1, instead of the particulate water absorbing agent (1) used in Example 5, an absorbing substrate for comparative evaluation (1) was obtained. The absorbing substrate for comparative evaluation (1) had thickness of 6 mm. Re-wet amount of thus obtained absorbing substrate for comparative evaluation (1) was evaluated and state of the absorbing substrate after liquid absorption was observed. Results are shown in Table 6.

Example 9

To 100 parts by weight of the surface crosslinked water-absorbing resin (1) obtained in Reference Example 1, each 1 part, 3 parts and 5 parts by weight of water was mixed by spraying. The resultant mixtures were heated and cured at 60° C. for 1 hour, while water contents thereof were maintained at 1%, 3% and 5% by weight, respectively, followed by passing through a metal screen having mesh size of 600 μm. To each 100 parts by weight of thus obtained particulate water absorbing agents, 0.3 part by weight of fine particulate silicon dioxide (Trade Name: Aerosil 200) was added and mixed (dry blended) to obtain particulate water absorbing agents (5), (6) and (7), respectively. Ratio of agglomerated particles in the particulate water absorbing agents (5), (6) and (7) are 15% by weight, 33% by weight and 50% by weight, respectively. Evaluation results on the particulate water absorbing agents (5), (6) and (7) are shown for centrifuge retention capacity, absorbency against pressure at 1.9 kPa, absorption speed, fluidity after moisture absorption, reduction ratio of mass median particle size by impact, bulk density of gel after saturated swelling in a physiological saline solution, water content, liquid permeation time under pressure and shortening ratio of liquid permeation time under pressure in Table 7, for particle size distribution in Table 8, and for mass median particle size and logarithmic standard deviation in Table 9.

Comparative Example 3

To 100 parts by weight of the surface crosslinked water-absorbing resin (1) obtained in Reference Example 1, 0.3 part by weight of fine particulate silicon dioxide (Trade Name: Aerosil 200) was added and mixed (dry blended) to obtain a comparative particulate water absorbing agent (2). The comparative particulate water absorbing agent (2) was evaluated similarly as in Example 9. Results are shown in Tables 7 to 9. Result of volume resistivity is shown in Table 5.

Example 10

To 100 parts by weight of the surface crosslinked water-absorbing resin (1) obtained in Reference Example 1, 3 parts by weight of water was mixed by spraying. The resultant mixture was heated and cured at 60° C. for 1 hour, while water content thereof was maintained at 3% by weight, followed by passing through a metal screen having mesh size of 600 μm. To 100 parts by weight of thus obtained particulate water absorbing agent, 0.3 part by weight of fine particulate aluminum oxide (Trade Name: UFA-150, Supplier: Showa Denko K.K.) was added and mixed (dry blended) to obtain a particulate water absorbing agent (8), containing agglomerated particles of 33% by weight. The obtained particulate water absorbing agent (8) was evaluated similarly as in Example 9. Results are shown in Tables 7 to 9.

Comparative Example 4

To 100 parts by weight of the surface crosslinked water-absorbing resin (1) obtained in Reference Example 1, 0.3 part by weight of fine particulate aluminum oxide (Trade Name: UFA-150, Supplier: Showa Denko K.K.) was added and mixed (dry blended) to obtain a comparative particulate water absorbing agent (3). The obtained comparative particulate water absorbing agent (3) was evaluated similarly as in Example 9. Results are shown in Tables 7 to 9.

Example 11

Similar procedures as in Example 10 were repeated except for using Zinc and Silicon composite hydrated oxide (Trade Name: CERATIOX SZ-100, from Titan Kogyo K.K., weight ratio of Zn/Si contents=82/18, average particle diameter=0.36 μm) instead of the fine particulate aluminium oxide, to obtain a particulate water absorbing agent (9). The particulate water absorbing agent (9) was evaluated similarly as in Example 9. Results are shown in Tables 7 to 9.

Comparative Example 5

To 100 parts by weight of the surface crosslinked water-absorbing resin (1) obtained in Reference Example 1, 0.3 part by weight of Zinc and Silicon composite hydrated oxide (Trade Name: CERATIOX SZ-100, from Titan Kogyo K.K., weight ratio of Zn/Si contents=82/18, average particle size =0.36 μm) was added and mixed (dry blended) to obtain a comparative particulate water absorbing agent (4). The obtained comparative particulate water absorbing agent (4) was evaluated similarly as in Example 9. Results are shown in Tables 7 to 9.

Reference Example 4

To 5,500 g of a sodium acrylate aqueous solution (monomer concentration: 38% by weight) having 75% by mole of neutralization ratio, 7.5 g of polyethylene glycol diacrylate (average added moles number of ethylene oxide unit: 9) was dissolved to prepare reaction liquid. Then, the reaction liquid was charged into the reactor used in Reference Example 1, Nitrogen gas was introduced in the reaction system to purge out dissolved oxygen while the reaction liquid was maintained at 30° C. Subsequently, 29.8 g of a 10% by weight sodium persulfate aqueous solution and 1.5 g of a 1% by weight L-ascorbic acid aqueous solution were added. After 1 minute, polymerization was initiated. Polymerization temperature showed peak temperature of 86° C. after 17 minutes from the initiation of polymerization, and a hydrated gel-like polymer was taken out after 60 minutes from the initiation of polymerization. Thus obtained hydrated gel-like polymer was in granulated state to particles with diameter of about of 1 to 4 mm. This granulated hydrated gel-like polymer was spread on a 50 mesh screen (mesh opening of 300 μm) and dried at 160° C. for 60 minutes by hot air. Then, the dried polymer was pulverized using a roll mill, followed by continuously classifying with screens having mesh sizes of 450 μm and 106 μm. Particles not smaller than 450 μm were pulverized again using a roll mill. Particles passing a 106 μm mesh metal screen were 13% by weight based on total particles subjected to pulverization. A fine water-absorbing resin particle passed the 106 μm mesh metal screen was mixed with hot water (90° C.) in the same quantity, dried again under the same conditions and pulverized to obtain a particulate water-absorbing resin (d) having irregularly pulverized shape in 98% yield.

Subsequently, to 100 parts by weight of thus obtained particulate water-absorbing resin (d), 0.7 part by weight of a surface crosslinking agent aqueous solution consisting of 0.1 part by weight of ethylene glycol diglycidyl ether, 0.3 part by weight of propylene glycol and 0.3 part by weight of water. The mixture was heated at 210° C. for 20 minutes in a mortar mixer to obtain a water-absorbing resin (4). Results of evaluation on the water-absorbing resin (4) are shown for particle size distribution in Table 8 and for mass median particle size and logarithmic standard deviation in Table 9. Agglomerated particles were little observed in the water-absorbing resin (4)

Example 12

To 100 parts by weight of the surface crosslinked water-absorbing resin (4) obtained in Reference Example 4, a solution consisting of 0.01 part by weight of sodium diethylenetriamine pentaacetate, 0.1 part by weight of a 15% by weight aqueous solution of extract from plant leaves of Theaceae plant (Trade Name: FS-80MO, Supplier: Shiraimatu Shinyaku Co., Ltd., Address: 37-1 Ugawa, Mizuguchi-Cho, kouga-Gun, Shiga-Ken, Japan) and 3 parts by weight of water, was mixed by spraying. The resultant mixture was heated and cured at 60° C. for 1 hour while maintaining water content thereof at 3% by weight, followed by passing through a screen with mesh size of 600 μm. To 100 parts by weight of thus obtained particulate water absorbing agent, 0.3 part by weight of fine particulate silicon dioxide (Trade Name: Aerosil 200) was added and mixed (dry blended) to obtain a particulate water absorbing agent (10) containing 35% by weight of agglomerated particles. The obtained particulate water absorbing agent (10) was evaluated similarly as in Example 9. Results are shown in Tables 7 to 9.

Comparative Example 6

To 100 parts by weight of the water-absorbing resin (4) obtained in Reference Example 4, 0.3 part by weight of fine particulate silicon dioxide (Trade Name: Aerosil 200) was added and mixed (dry blended) to obtain, a comparative particulate water absorbing agent (5). The obtained comparative particulate water absorbing agent (5) was evaluated similarly as in Example 9. Results are shown in Tables 7 to 9.

Comparative Example 7

To 100 parts by weight of the water-absorbing resin (3) obtained in Reference Example 3, 0.3 part by weight of fine particulate silicon dioxide (Trade Name: Aerosil 200) was added and mixed (dry blended) to obtain a comparative water absorbing agent (6). The obtained comparative water absorbing agent (6) was evaluated similarly as in Example 9. Results are shown in Tables 7 to 9.

TABLE 1

| | CRC (g/g) | Weight Average Particle Size (μm) | Percentage of particles smaller than 600 μm and not less than 150 μm (%) | Logarithmic Standard Deviation (δζ) |
|---|---|---|---|---|
| WARP (a) | 55 | 290 | 93 | 0.360 |
| WARP (b) | 36 | 469 | 76 | 0.375 |
| WARP (c) | 46 | 254 | 92 | 0.331 |
| WARP (d) | 39 | 271 | 92 | 0.355 |

WARP: Water-absorbing resin particle,
CRC: Centrifuge Retention Capacity

TABLE 2

| Particulate Water Absorbing agent | CRC (g/g) | AAP at 1.9 kPa (g/g) | Absorption speed (sec.) | Fluidity after moisture absorption (%) | Reduction Ratio of mass median particle size by impact (%) | Bulk density of gel after saturated swelling (g/cm$^3$) | Water content (% by weight) |
|---|---|---|---|---|---|---|---|
| PWA (1) | 42 | 35 | 32 | 50 | 9 | 0.98 | 4.3 |
| PWA (2) | 42 | 35 | 32 | 50 | 9 | 0.98 | 5.2 |
| PWA (3) | 42 | 35 | 32 | 0 | 7 | 0.99 | 4.4 |
| PWA (4) | 37 | 28 | 20 | 0 | 15 | 0.88 | 4.7 |
| Com. PWA (1) | 29 | 28 | 65 | 0 | 0 | 0.66 | 0.2 |

PWA: Particulate water absorbing agent,
Com. PWA: Comparative particulate water absorbing agent
CRC: Centrifuge Retention Capacity,
AAP: Absorbency Against Pressure

TABLE 3

| | Water-Absorbing Resin and Particulate Water Absorbing agent | Not smaller than 850 μm (wt %) | Not smaller than 710 μm Smaller than 850 μm (Wt %) | Not smaller than 600 μm Smaller than 710 μm (Wt %) | Not smaller than 500 μm Smaller than 600 μm (Wt %) | Not smaller than 425 μm Smaller than 500 μm (Wt %) | Not smaller than 300 μm Smaller than 425 μm (Wt %) | Not smaller than 212 μm Smaller than 300 μm (Wt %) | Not smaller than 150 μm Smaller than 212 μm (Wt %) | Not smaller than 45 μm Smaller than 150 μm (Wt %) | Smaller than 45 μm (Wt %) |
|---|---|---|---|---|---|---|---|---|---|---|---|
| Ref. Ex. 1 | WAR (1) | 0 | 0 | 0 | 0.3 | 5 | 43 | 26 | 19 | 6.2 | 0.7 |
| Ref. Ex. 2 | WAR (2) | 0 | 1 | 20 | 25 | 14 | 23 | 12 | 3 | 2.2 | 0.0 |
| Ref. Ex. 3 | WAR (3) | 0 | 0 | 0 | 0 | 1 | 35 | 32 | 24 | 6.9 | 1.0 |
| Ex. 1 | PWA (1) | 0 | 0 | 0 | 4 | 11 | 45 | 20 | 16 | 3.5 | 0.1 |
| Ex. 2 | PWA (2) | 0 | 0 | 0 | 4 | 13 | 44 | 19 | 17 | 2.8 | 0.0 |
| Ex. 3 | PWA (3) | 0 | 0 | 0 | 4 | 11 | 45 | 20 | 16 | 3.5 | 0.1 |
| Ex. 4 | PWA (4) | 0 | 0 | 0 | 1 | 8 | 44 | 23 | 21 | 2.9 | 0.1 |
| Comp. Ex. 1 | Comp. PWA (1) | 0 | 1 | 20 | 25 | 14 | 23 | 12 | 3 | 2.2 | 0.0 |

Ref. Ex.: Reference Example,
Ex.: Example,
Comp. Ex.: Comparative Example
WAR: Water-absorbing resin,
PWA: Particulate water absorbing agent

TABLE 4

| | Water-Absorbing Resin and Particulate Water Absorbing agent | Mass median particle size D50 (μm) | Logarithmic Standard Deviation (δζ) |
|---|---|---|---|
| Reference Example 1 | Water-absorbing resin (1) | 294 | 0.351 |
| Reference Example 2 | Water-absorbing resin (2) | 477 | 0.369 |
| Reference Example 3 | Water-absorbing resin (3) | 258 | 0.329 |
| Example 1 | Particulate water absorbing agent (1) | 321 | 0.373 |
| Example 2 | Particulate water absorbing agent (2) | 325 | 0.379 |
| Example 3 | Particulate water absorbing agent (3) | 321 | 0.373 |
| Example 4 | Particulate water absorbing agent (4) | 306 | 0.349 |
| Comparative Example 1 | Comparative Particulate water absorbing agent (1) | 477 | 0.369 |

TABLE 5

| | Water-Absorbing Resin or Particulate Water Absorbing agent | Volume Resistivity [Ωm] |
|---|---|---|
| Example 1 | Particulate water absorbing agent (1) | $5.3 \times 10^8$ |
| Example 3 | Particulate water absorbing agent (3) | $2.6 \times 10^8$ |
| Example 4 | Particulate water absorbing agent (4) | $5.3 \times 10^8$ |
| Reference Example 1 | Water-absorbing resin (1) | $4.5 \times 10^{11}$ |
| Comparative Example 3 | Comparative water absorbing agent (2) | $4.1 \times 10^{11}$ |

TABLE 6

| | Absorbing Substrate | Particulate Water Absorbing agent used | Re-wet Amount for 10 Min. (g) | State of Absorbing Substrate after Liquid Absorption |
|---|---|---|---|---|
| Example 5 | Absorbing substrate for evaluation (1) | Particulate water absorbing agent (1) | 3 | Without ruggedness on absorbing substrate |
| Example 6 | Absorbing substrate for evaluation (2) | Particulate water absorbing agent (2) | 3 | Without ruggedness on absorbing substrate |
| Example 7 | Absorbing substrate for evaluation (3) | Particulate water absorbing agent (3) | 5 | Without ruggedness on absorbing substrate |
| Example 8 | Absorbing substrate for evaluation (4) | Particulate water absorbing agent (4) | 5 | Without ruggedness on absorbing substrate |
| Comparative Example 2 | Absorbing substrate for comparative evaluation (1) | Comparative particulate water absorbing agent (1) | 12 | With ruggedness on absorbing substrate |

TABLE 7

| | Particulate water absorbing agent | CRC (g/g) | AAP at 1.9 kPa (g/g) | Absorption speed (sec.) | Fluidity (%) | Reduction ratio of MPS (%) | Gel density after SS (g/cm³) | Water content (% by wt) | LPT under pressure (sec.) | SR LPT under pressure (%) |
|---|---|---|---|---|---|---|---|---|---|---|
| Ex. 9 | PWA (5) | 44 | 22 | 28 | 0 | 7 | 0.95 | 1.2 | 60 | 29 |
| | PWA (6) | 43 | 22 | 27 | 0 | 9 | 0.94 | 3.1 | 57 | 32 |
| | PWA (7) | 42 | 22 | 26 | 0 | 12 | 0.93 | 5 | 56 | 33 |
| Comp. Ex. 3 | Comp. PWA (2) | 44 | 22 | 28 | 0 | 2 | 0.96 | 0.1 | 84 | — |
| Ex. 10 | PWA (8) | 43 | 24 | 29 | 0 | 9 | 0.94 | 3.3 | 55 | 30 |
| Comp. Ex. 4 | Comp. PWA (3) | 44 | 24 | 30 | 0 | 2 | 0.95 | 0.2 | 79 | — |
| Ex. 11 | PWA (9) | 43 | 28 | 32 | 0 | 9 | 0.98 | 3.1 | 153 | 24 |
| Comp. Ex. 5 | Comp. PWA (4) | 44 | 28 | 32 | 0 | 2 | 0.98 | 0.1 | 200 | — |
| Ex. 12 | PWA (10) | 35 | 22 | 29 | 0 | 15 | 0.90 | 3.3 | 26 | 30 |
| Comp. Ex. 6 | Comp. PWA (5) | 36 | 22 | 30 | 0 | 2 | 0.90 | 0.2 | 37 | — |
| Ex. 4 | PWA (4) | 37 | 28 | 20 | 0 | 15 | 0.88 | 4.7 | 19 | 27 |
| Comp. Ex. 7 | Comp. PWA (6) | 38 | 29 | 21 | 0 | 1 | 0.85 | 0.1 | 26 | — |

Ex.: Example,
Comp. Ex.: Comparative Example,
WAR: Water-absorbing resin,
PWA: Particulate water absorbing agent,
Comp. PWA: Comparative particulate water absorbing agent,
CRC: Centrifuge retention capacity,
AAP: Absorbency against pressure, fluidity; fluidity after moisture absorption,
Reduction Ratio of MPS: Reduction ratio of mass median particle size by impact,
Gel density after SS: Bulk density of gel after saturated swelling,
LPT under Pressure: Liquid permeation time Under pressure,
SR LPT under Pressure: Shortening ratio of liquid permeation time Under pressure

TABLE 8

| | Water-Absorbing Resin and Particulate Water Absorbing agent | Not smaller than 850 μm (wt %) | Not smaller than 710 μm Smaller than 850 μm (Wt %) | Not smaller than 600 μm Smaller than 710 μm (Wt %) | Not smaller than 500 μm Smaller than 600 μm (Wt %) | Not smaller than 425 μm Smaller than 500 μm (Wt %) | Not smaller than 300 μm Smaller than 425 μm (Wt %) | Not smaller than 212 μm Smaller than 300 μm (Wt %) | Not smaller than 150 μm Smaller than 212 μm (Wt %) | Not smaller than 45 μm Smaller than 150 μm (Wt %) | Smaller than 45 μm (Wt %) |
|---|---|---|---|---|---|---|---|---|---|---|---|
| Ref. Ex. 4 | WAR (4) | 0 | 0 | 0 | 0.1 | 3 | 40 | 27 | 21 | 6.8 | 0.9 |
| Ex. 9 | PWA (5) | 0 | 0 | 0 | 3 | 9 | 45 | 30 | 9 | 3.6 | 0.1 |
| Ex. 9 | PWA (6) | 0 | 0 | 0 | 3 | 11 | 46 | 28 | 9 | 2.8 | 0.1 |
| Ex. 9 | PWA (7) | 0 | 0 | 0 | 4 | 12 | 47 | 26 | 8 | 2.5 | 0.0 |
| Ex. 10 | PWA (8) | 0 | 0 | 0 | 3 | 11 | 46 | 28 | 9 | 2.8 | 0.1 |
| Ex. 11 | PWA (9) | 0 | 0 | 0 | 3 | 11 | 46 | 28 | 9 | 2.8 | 0.1 |
| Ex. 12 | PWA (10) | 0 | 0 | 0 | 4 | 10 | 48 | 27 | 8 | 2.6 | 0.1 |
| Comp. Ex. 3 | Comp. PWA (2) | 0 | 0 | 0 | 0.3 | 5 | 43 | 26 | 19 | 6.2 | 0.7 |
| Comp. Ex. 4 | Comp. PWA (3) | 0 | 0 | 0 | 0.3 | 5 | 43 | 26 | 19 | 6.2 | 0.7 |
| Comp. Ex. 5 | Comp. PWA (4) | 0 | 0 | 0 | 0.3 | 5 | 43 | 26 | 19 | 6.2 | 0.7 |
| Comp. Ex. 6 | Comp. PWA (5) | 0 | 0 | 0 | 0.1 | 3 | 40 | 27 | 21 | 6.8 | 0.9 |
| Comp. Ex. 7 | Comp. PWA (6) | 0 | 0 | 0 | 0.1 | 2 | 39 | 27 | 22 | 7.0 | 1.0 |

Ref. Ex.: Reference Example,
Ex.: Example,
Comp. Ex.: Comparative Example
WAR: Water-absorbing resin,
PWA: Particulate water absorbing agent

TABLE 9

| | Water-Absorbing Resin and Particulate Water Absorbing agent | Mass median Particle Size D50 (μm) | Logarithmic Standard Deviation (δζ) |
|---|---|---|---|
| Reference Example 4 | Water-absorbing resin particle (d) | 275 | 0.351 |
| Example 9 | Particulate water absorbing agent (5) | 314 | 0.302 |
| Example 9 | Particulate water absorbing agent (6) | 321 | 0.304 |
| Example 9 | Particulate water absorbing agent (7) | 327 | 0.304 |
| Example 10 | Particulate water absorbing agent (8) | 321 | 0.304 |
| Example 11 | Particulate water absorbing agent (9) | 321 | 0.304 |
| Example 12 | Particulate water absorbing agent (10) | 324 | 0.295 |
| Comparative Example 3 | Comparative particulate water absorbing agent (2) | 294 | 0.351 |
| Comparative Example 4 | Comparative particulate water absorbing agent (3) | 294 | 0.351 |
| Comparative Example 5 | Comparative particulate water absorbing agent (4) | 294 | 0.351 |
| Comparative Example 6 | Comparative particulate water absorbing agent (5) | 275 | 0.351 |
| Comparative Example 7 | Comparative particulate water absorbing agent (6) | 258 | 0.329 |

A particulate water absorbing agent with irregularly pulverized shape of the present invention has, as shown in Tables 2, 3, 7 and 8, well controlled particle size, high absorbency and high bulk density of gel after saturated swelling in a physiological saline solution.

Such particulate water absorbing agent of the present invention also has superior absorption speed and powder fluidity, and by the addition of an additive to improve fluidity after moisture absorption, it has improved fluidity as shown in Tables 2 and 7.

Further, because a particulate water absorbing agent of the present invention contains agglomerated particles, it can reduce liquid permeation time under pressure as shown in Table 7.

A particulate water absorbing agent of the present invention exhibits low volume resistivity as shown in Table 5.

Still further, a particulate water absorbing agent of the present invention provides a thin type absorbing substrate with less Re-wet amount as shown in Table 6, and further provides absorbing article such as a diaper with good feeling in use and stable and high performance, because the absorbing substrate exhibits little variation in liquid absorbing state without becoming rugged surface after absorbing liquid, different from an absorbing substrate in Comparative Example 1.

INDUSTRIAL APPLICABILITY

A particulate water absorbing agent obtained according to the present invention is a water-absorbing agent containing agglomerated particles, and has specifically controlled particle size distribution, and thereby exerts effect to provide an absorbing substrate with far more superior absorption ability and feeling in use in comparison with a conventional absorbing substrate, when used in a thin type absorbing substrate such as a diaper.

The invention claimed is:
1. A particulate water absorbing agent having irregularly pulverized shape, wherein said particulate water absorbing agent comprises a surface crosslinked water-absorbing resin obtained by crosslinking polymerization of an unsaturated monomer mainly composed of acrylic acid and/or salts thereof, said particulate water absorbing agent contains agglomerated particles therein, and further said particulate water absorbing agent satisfies (i) to (iii) described below:
  (i) centrifuge retention capacity (CRC) of the particulate water absorbing agent in a physiological saline solution being not lower than 32 g/g;
  (ii) mass median particle size (D50) of the particulate water absorbing agent being in the range of 200 to 400 μm; and
  (iii) particles of the particulate water absorbing agent smaller than 600 μm and not smaller than 150 μm being in the range of 95 to 100% by weight,
  wherein water content of the particulate water absorbing agent is 1 to 10% by weight.

2. A particulate water absorbing agent having irregularly pulverized shape according to claim 1, wherein decreased ratio of the mass median particle size by impact of the particulate water absorbing agent is 5, to 30%.

3. A particulate water absorbing agent having irregularly pulverized shape according to claim 1, wherein increased ratio of the mass median particle size of the particulate Water absorbing agent due to agglomeration is 5, to 30%.

4. A particulate water absorbing agent having irregularly pulverized shape according to claim 1, wherein liquid permeation time under pressure of the particulate water absorbing agent is not longer than 60 seconds.

5. A particulate water absorbing agent having irregularly pulverized shape according to claim 1, wherein absorbency against pressure at 1.9 kPa of the particulate water absorbing agent in a physiological saline solution is not lower than 20 g/g.

6. A particulate water absorbing agent having irregularly pulverized shape according to claim 1, wherein vortex water absorption speed of the particulate water absorbing agent in a physiological saline solution is not longer than 60 seconds.

7. A particulate water absorbing agent having irregularly pulverized shape according to claim 1, wherein fluidity of the particulate water absorbing agent after moisture absorption is 0 to 20% by weight.

8. A particulate water absorbing agent having irregularly pulverized shape according to claim 1, wherein logarithmic standard deviation of particle size distribution of the particulate water absorbing agent is 0.20 to 0.40.

9. A particulate water absorbing agent having irregularly pulverized shape according to claim 1, wherein bulk density of gel after saturated swelling of the particulate water absorbing agent in a physiological saline solution is in the range of 0.80 to 1.0 (g/cm$^3$).

10. A particulate water absorbing agent having irregularly pulverized shape according to claim 1, which further comprises, besides the water-absorbing resin, one or more component selected from the group consisting of a chelating agent, a deodorant, a polyvalent metal salt and an inorganic fine particle.

11. An absorbing article for excrement, urine or blood, which includes absorbent substrate comprising a particulate water absorbing agent having irregularly pulverized shape according to claim 1 and hydrophilic fiber.

12. An absorbing article according to claim 11, wherein the absorbent substrate is a thin type with thickness of 0.1 to 5 mm.

13. An absorbing article according to claim 11, wherein content of the particulate water absorbing agent having irregularly pulverized shape is 30 to 100% by weight based on total weight of the particulate water absorbing agent and the hydrophilic fiber.

14. A method for production of a particulate water absorbing agent having irregularly pulverized shape, which particulate water absorbing agent comprises a surface crosslinked water-absorbing resin obtained by crosslinking polymerization of an unsaturated monomer mainly composed of acrylic acid and/or salts thereof and further via drying and pulverizing steps, and said particulate water absorbing agent contains agglomerated particles therein, which method comprising:
  a step of crosslinking polymerization of an aqueous solution of an unsaturated monomer containing a non-neutralized acrylic acid and/or salts thereof in the presence of a crosslinking agent;
  a step of further surface crosslinking of a water-absorbing resin particle obtained by the polymerization and said water absorbing resin particle satisfying (i) to (iii) described below:
    (i) centrifuge retention capacity (CRC) of the water-absorbing resin particle in a physiological saline solution being not lower than 32 g/g,
    (ii) mass median particle size (D50) of the water-absorbing resin particle being in the range of 150 to 380 μm, and
    (iii) the water-absorbing resin particles smaller than 600 μm and not smaller than 150 μm being in the range of 92 to 100% by weight; and
  a step of further adding aqueous liquid thereto after the surface crosslinking and heating the resin particles while maintaining water content thereof at 1 to 10% by weight and further controlling particle size.

15. A method for production of a particulate water absorbing agent having irregularly pulverized shape according to claim 14, wherein the step of crosslinking polymerization is conducted in the presence of a chain transfer agent.

16. A method for production of a particulate water absorbing agent having irregularly pulverized shape according to claim 14,
  wherein the aqueous solution of the unsaturated monomer containing a non-neutralized acrylic acid in concentration of 10 to 30% by weight is crosslinking polymerized in the presence of a crosslinking agent; and
  the obtained resin is neutralized after polymerization.

17. A method for production of a particulate water absorbing agent having irregularly pulverized shape according to claim 14, which method comprises a step of the addition of a chelating agent at one or more timings selected from the group consisting of (i) during polymerization, (ii) after the polymerization and before surface crosslinking, and (iii) during surface crosslinking.

18. A method for production of a particulate water absorbing agent having irregularly pulverized shape according to claim 14, further comprising a step of recovering and regenerating fine particles of the resin which are excluded from the pulverizing step, thereby obtaining a water-absorbing resin particle at yield of not lower than 90% by weight based on weight of feed monomer to be polymerized as solid content equivalent.

19. A method for production of a particulate water absorbing agent having irregularly pulverized shape according to claim 14, wherein the water-absorbing resin particles are agglomerated so that shortening ratio of liquid permeation time under pressure is not lower than 10%.

20. A method for production of a particulate water absorbing agent having irregularly pulverized shape according to claim 19, further comprising a step of adding and mixing inorganic particles after the agglomeration step.

* * * * *